US010399474B2

(12) United States Patent
Kapusky et al.

(10) Patent No.: US 10,399,474 B2
(45) Date of Patent: Sep. 3, 2019

(54) MULTI-ADJUSTABLE HEAD RESTRAINT

(71) Applicant: Adient Luxembourg Holding S.à r.l., Luxembourg (LU)

(72) Inventors: Michael J. Kapusky, South Lyon, MI (US); Brent D. Burton, Windsor (CA); Nathan Caruss, Ann Arbor, MI (US); Eric B. Michalak, Canton, MI (US)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 33 days.

(21) Appl. No.: 15/446,770

(22) Filed: Mar. 1, 2017

(65) Prior Publication Data
US 2017/0253153 A1    Sep. 7, 2017

Related U.S. Application Data

(60) Provisional application No. 62/302,783, filed on Mar. 2, 2016.

(51) Int. Cl.
*B60N 2/829*    (2018.01)
*B60N 2/853*    (2018.01)
*B60N 2/885*    (2018.01)
*B60N 2/821*    (2018.01)
*B60N 2/85*    (2018.01)

(52) U.S. Cl.
CPC ............ *B60N 2/829* (2018.02); *B60N 2/821* (2018.02); *B60N 2/85* (2018.02); *B60N 2/853* (2018.02); *B60N 2/885* (2018.02)

(58) Field of Classification Search
CPC .......... B60N 2/821; B60N 2/829; B60N 2/85; B60N 2/853; B60N 2/885; B60N 2/809; B60N 2/838; B60N 2/868
USPC .......................... 297/61, 397, 406, 408, 410
See application file for complete search history.

(56) References Cited

U.S. PATENT DOCUMENTS

| | | | | |
|---|---|---|---|---|
| 4,637,655 A | * | 1/1987 | Fourrey | B60N 2/829 297/410 |
| 5,052,754 A | * | 10/1991 | Chinomi | B60N 2/829 297/408 |
| 5,105,132 A | * | 4/1992 | Sakannoto | B60N 2/856 318/434 |
| 5,288,129 A | * | 2/1994 | Nemoto | B60N 2/829 297/410 |

(Continued)

*Primary Examiner* — James M Ference
(74) *Attorney, Agent, or Firm* — Foley & Lardner LLP

(57) ABSTRACT

An adjustable head restraint assembly for a seat back of a seat that includes a head supporting structure, a head rest support, and at least two of a height adjustment mechanism, a side angle adjustment mechanism, and a tilt adjustment mechanism that are each electronically powered. The head supporting structure is configured to support an occupant's head. The head rest support supports the head supporting structure. The height adjustment mechanism is configured to change the height of the head supporting structure relative to the head rest support and the seat back. The side angle adjustment mechanism is configured to change the angle of side portions of the head supporting structure relative to a center portion of the head supporting structure. The tilt adjustment mechanism is configured to change a tilt angle of the head supporting structure relative to a tilt supporting structure and the seat back.

17 Claims, 26 Drawing Sheets

(56) References Cited

U.S. PATENT DOCUMENTS

| | | | | |
|---|---|---|---|---|
| 5,378,043 A * | 1/1995 | Viano | B60N 2/838 | 297/408 |
| 5,664,841 A * | 9/1997 | Dal Monte | B60N 2/62 | 297/408 |
| 5,997,091 A * | 12/1999 | Rech | B60N 2/885 | 297/391 |
| 6,007,154 A * | 12/1999 | Parker | B60N 2/809 | 297/410 |
| 6,250,716 B1 * | 6/2001 | Clough | A47C 7/383 | 297/408 |
| 6,305,749 B1 * | 10/2001 | O'Connor | A47C 7/383 | 297/397 |
| 6,513,871 B2 * | 2/2003 | Bartels | B60N 2/885 | 297/216.12 |
| 6,648,416 B2 * | 11/2003 | O'Connor | A47C 7/383 | 297/397 |
| 6,863,343 B2 * | 3/2005 | Pal | B60N 2/865 | 297/216.12 |
| 6,880,889 B2 * | 4/2005 | Lomagno | B60N 2/865 | 297/408 |
| 6,962,392 B2 * | 11/2005 | O'Connor | A47C 7/38 | 297/61 |
| 7,040,705 B2 * | 5/2006 | Clough | A47C 7/38 | 297/410 |
| 7,080,886 B2 * | 7/2006 | Bauer | A47C 7/38 | 297/409 |
| 7,144,083 B2 * | 12/2006 | List | B60N 2/885 | 297/391 |
| 7,264,313 B2 * | 9/2007 | Clough | A47C 7/38 | 297/407 |
| 7,500,721 B2 * | 3/2009 | Beroth | B60N 2/821 | 297/410 |
| 7,543,888 B2 * | 6/2009 | Kuno | B60N 2/0232 | 297/353 |
| 7,631,932 B2 * | 12/2009 | Hoffmann | B60N 2/865 | 297/216.12 |
| 7,640,090 B2 * | 12/2009 | Uchida | B60N 2/002 | 701/49 |
| 7,665,693 B2 * | 2/2010 | Bettell | B64D 11/06 | 244/118.5 |
| 7,717,517 B2 * | 5/2010 | Yamane | B60N 2/43 | 297/408 |
| 8,152,242 B2 * | 4/2012 | Yetukuri | B60N 2/859 | 297/408 |
| 8,657,378 B2 * | 2/2014 | Kunert | B60N 2/815 | 297/391 |
| 8,911,020 B2 * | 12/2014 | Westerink | B60N 2/80 | 297/407 |
| 9,028,000 B2 * | 5/2015 | Millan | B60N 2/24 | 297/410 |
| 10,099,582 B2 * | 10/2018 | Wagner | B60N 2/844 | |
| 2002/0043860 A1 * | 4/2002 | Dinkel | B60N 2/809 | 297/410 |
| 2002/0158499 A1 * | 10/2002 | Clough | B60N 2/885 | 297/410 |
| 2004/0007910 A1 * | 1/2004 | Skelly | A47C 7/38 | 297/406 |
| 2004/0217639 A1 * | 11/2004 | Clough | A47C 7/38 | 297/391 |
| 2004/0239160 A1 * | 12/2004 | Thunnissen | B60N 2/838 | 297/216.12 |
| 2005/0121963 A1 * | 6/2005 | Williamson | B60N 2/01508 | 297/408 |
| 2007/0135982 A1 * | 6/2007 | Breed | B60J 10/00 | 701/36 |
| 2008/0012381 A1 * | 1/2008 | Yamaguchi | B60N 2/838 | 296/65.18 |
| 2008/0217971 A1 * | 9/2008 | Paluch | B60N 2/838 | 297/216.12 |
| 2009/0058162 A1 * | 3/2009 | Boes | B60N 2/888 | 297/406 |
| 2009/0146479 A1 * | 6/2009 | Boes | B60N 2/815 | 297/391 |
| 2009/0302660 A1 * | 12/2009 | Karlberg | B60N 2/885 | 297/404 |
| 2010/0123344 A1 * | 5/2010 | Villeminey | B60N 2/874 | 297/391 |
| 2010/0148559 A1 * | 6/2010 | Prokop | B60N 2/809 | 297/391 |
| 2010/0283306 A1 * | 11/2010 | Boes | B60N 2/809 | 297/408 |
| 2011/0109143 A1 * | 5/2011 | Maddelein | B60N 2/865 | 297/404 |
| 2012/0235452 A1 * | 9/2012 | Yetukuri | B60N 2/0228 | 297/217.1 |
| 2012/0326480 A1 * | 12/2012 | Misawa | B60N 2/847 | 297/391 |
| 2013/0221722 A1 * | 8/2013 | Navarro | B60N 2/885 | 297/391 |
| 2013/0278027 A1 * | 10/2013 | Brucato | B60N 2/838 | 297/216.12 |
| 2014/0001811 A1 * | 1/2014 | Haeske | B60N 2/809 | 297/409 |
| 2014/0203611 A1 * | 7/2014 | Kondrad | B60N 2/22 | 297/354.1 |
| 2014/0210239 A1 * | 7/2014 | Yetukuri | B60N 2/0228 | 297/217.1 |
| 2014/0300168 A1 * | 10/2014 | Szczygiel | B60N 2/885 | 297/391 |
| 2014/0333098 A1 * | 11/2014 | DeForest | B60N 2/002 | 297/61 |
| 2015/0130247 A1 * | 5/2015 | Kondrad | B60N 2/821 | 297/410 |
| 2015/0130248 A1 * | 5/2015 | Line | B60N 2/865 | 297/410 |
| 2015/0145309 A1 * | 5/2015 | Takahashi | B60N 2/809 | 297/404 |
| 2015/0203008 A1 * | 7/2015 | Wang | B60N 2/809 | 297/406 |
| 2015/0329025 A1 * | 11/2015 | Szczygiel | B60N 2/885 | 297/391 |
| 2015/0375650 A1 * | 12/2015 | Talamonti | B60N 2/874 | 297/409 |
| 2016/0023767 A1 * | 1/2016 | Zheng | B60N 2/809 | 297/408 |
| 2017/0113582 A1 * | 4/2017 | Michalak | B60N 2/809 | |
| 2017/0253153 A1 * | 9/2017 | Kapusky | B60N 2/853 | |

* cited by examiner

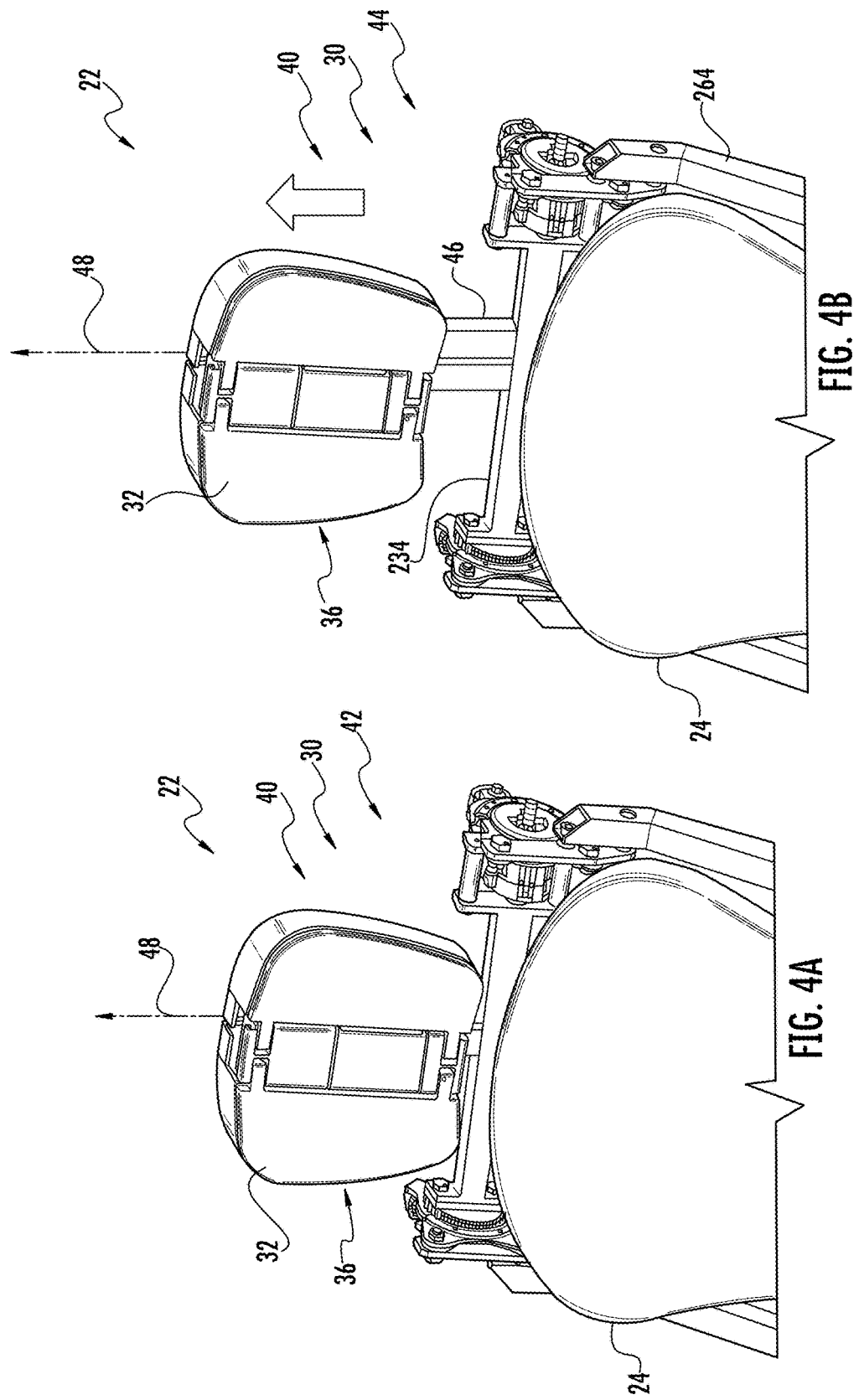

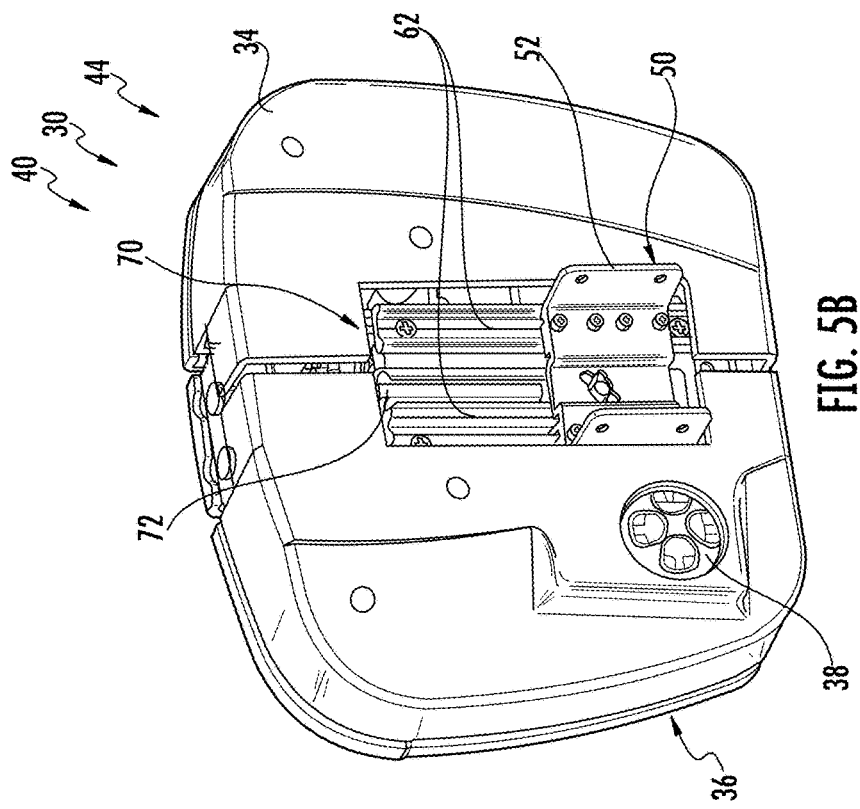
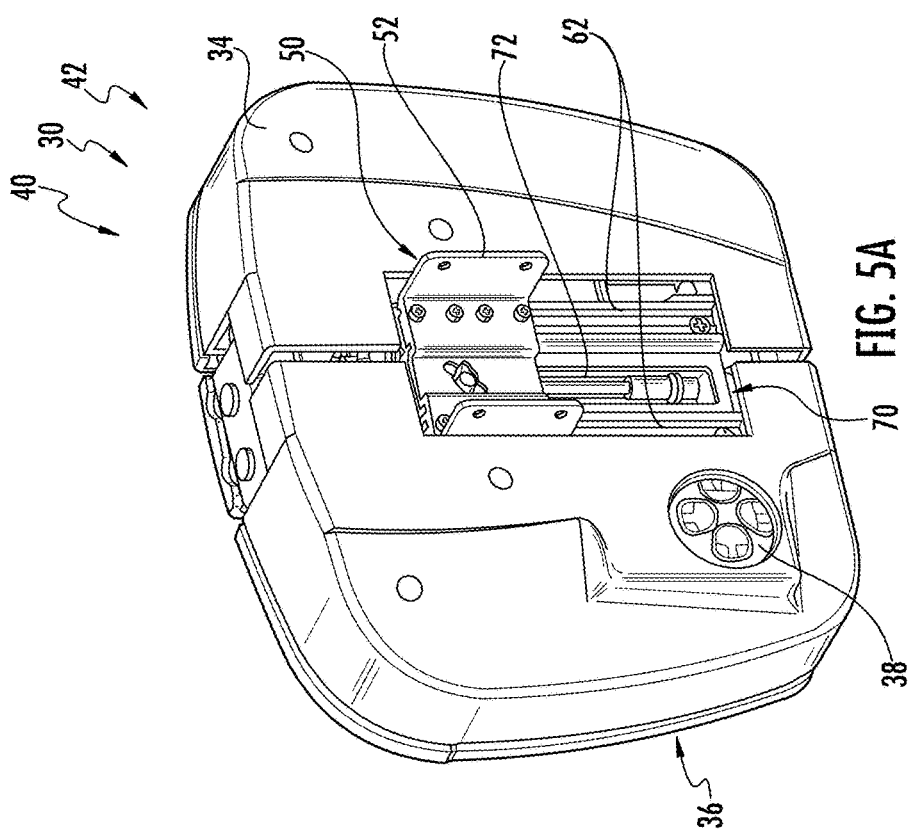

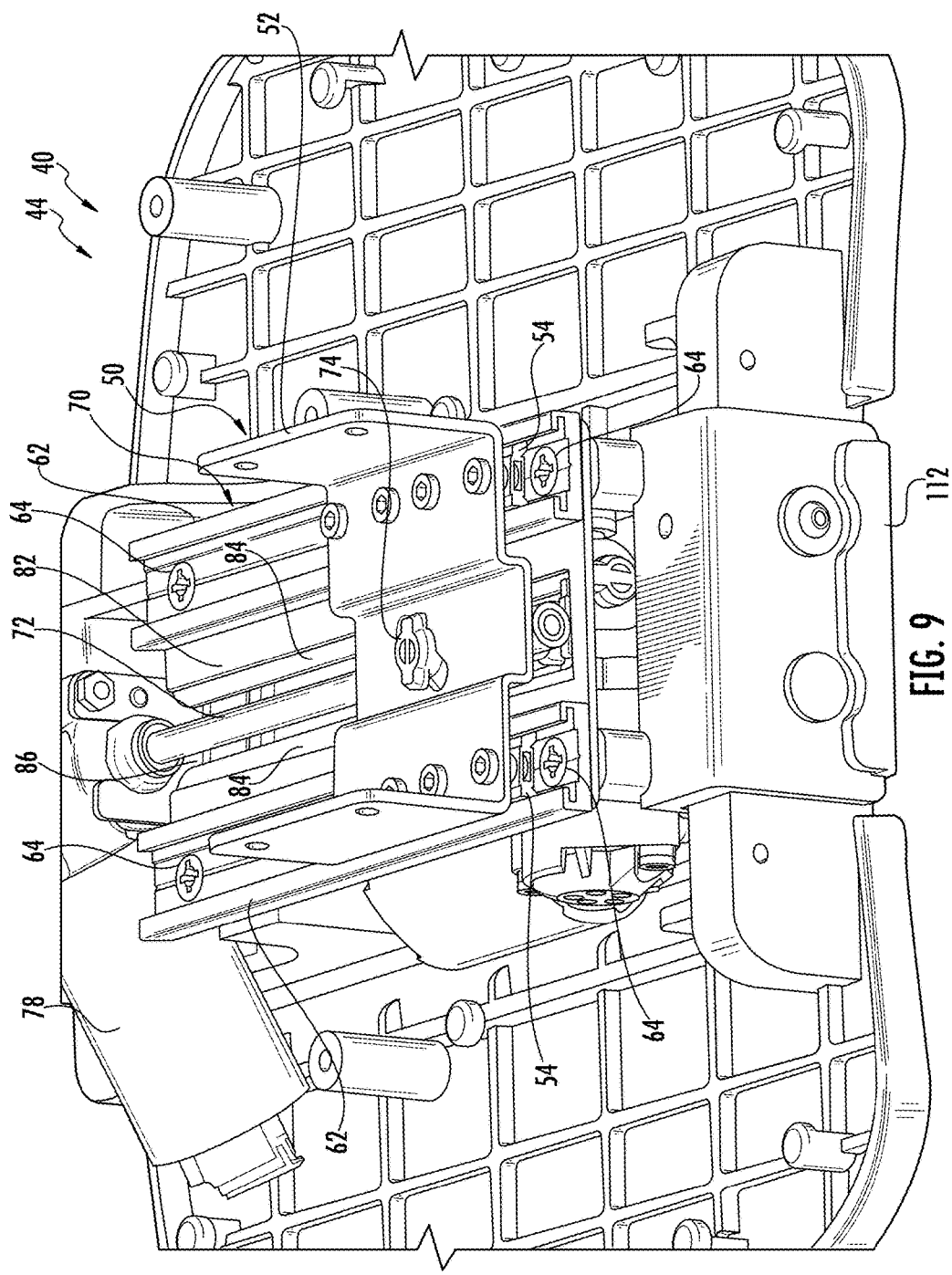

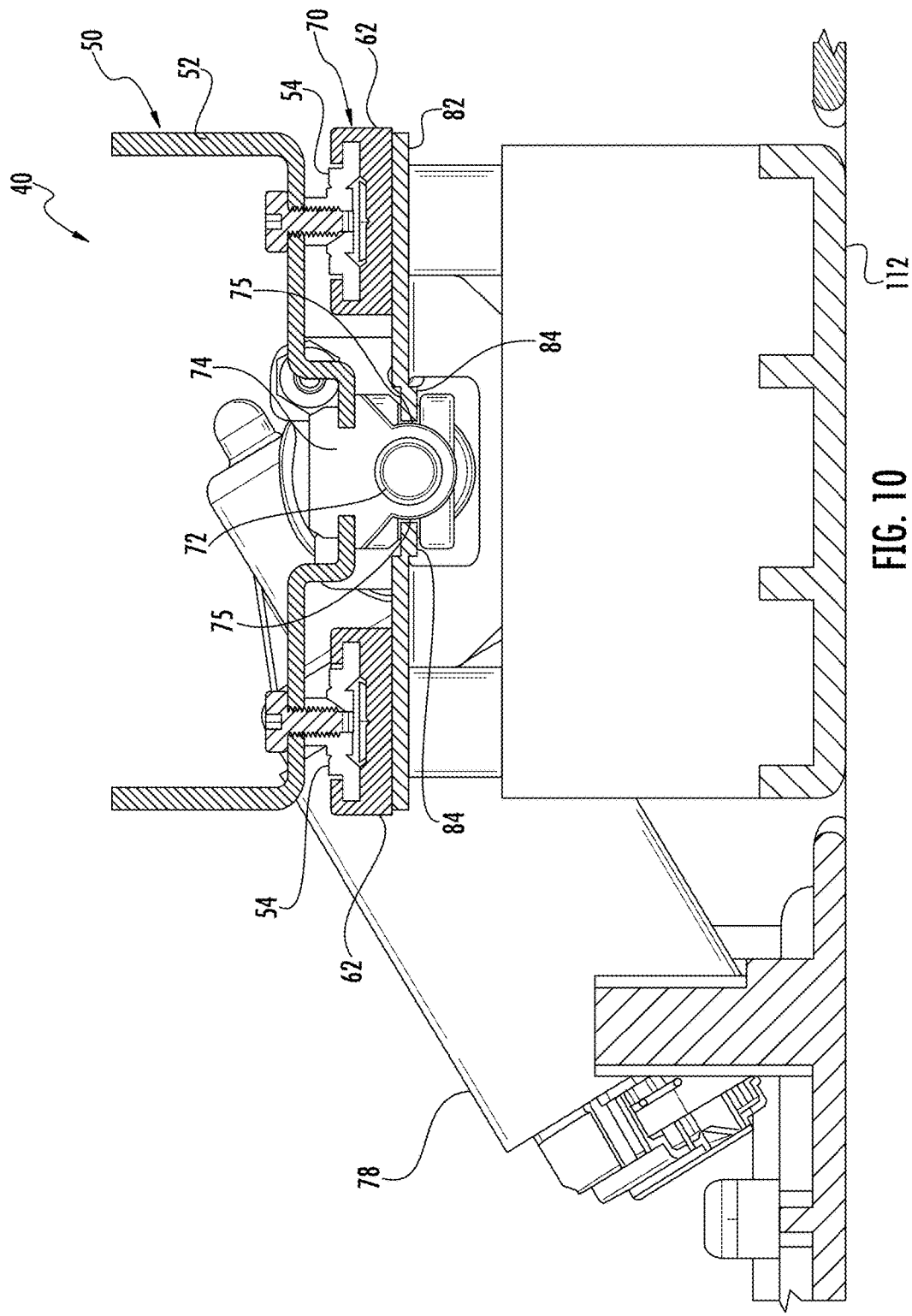

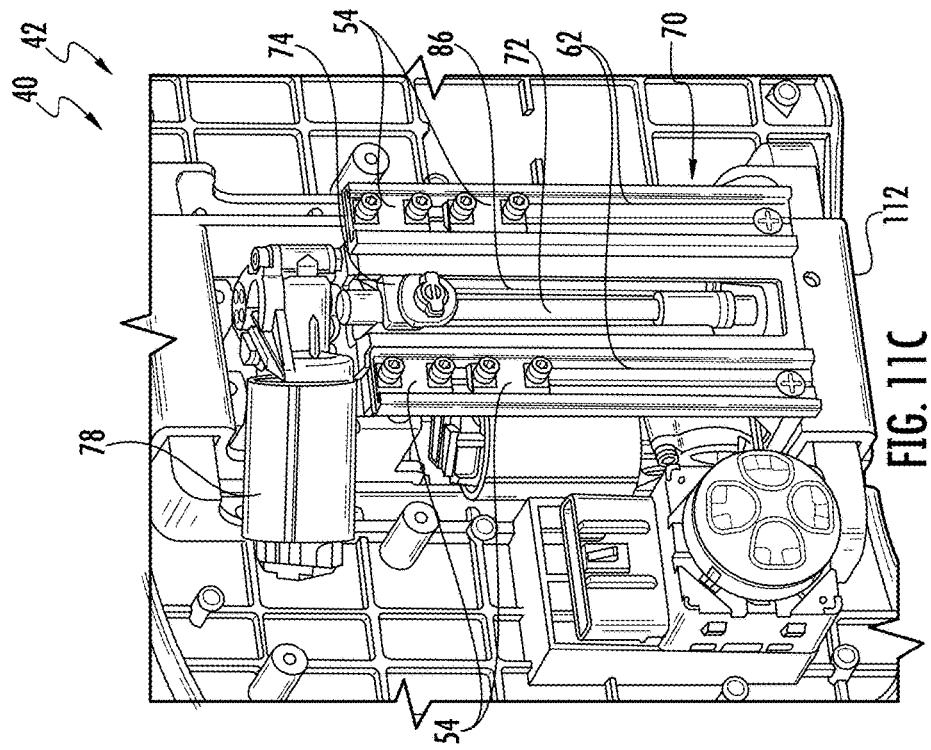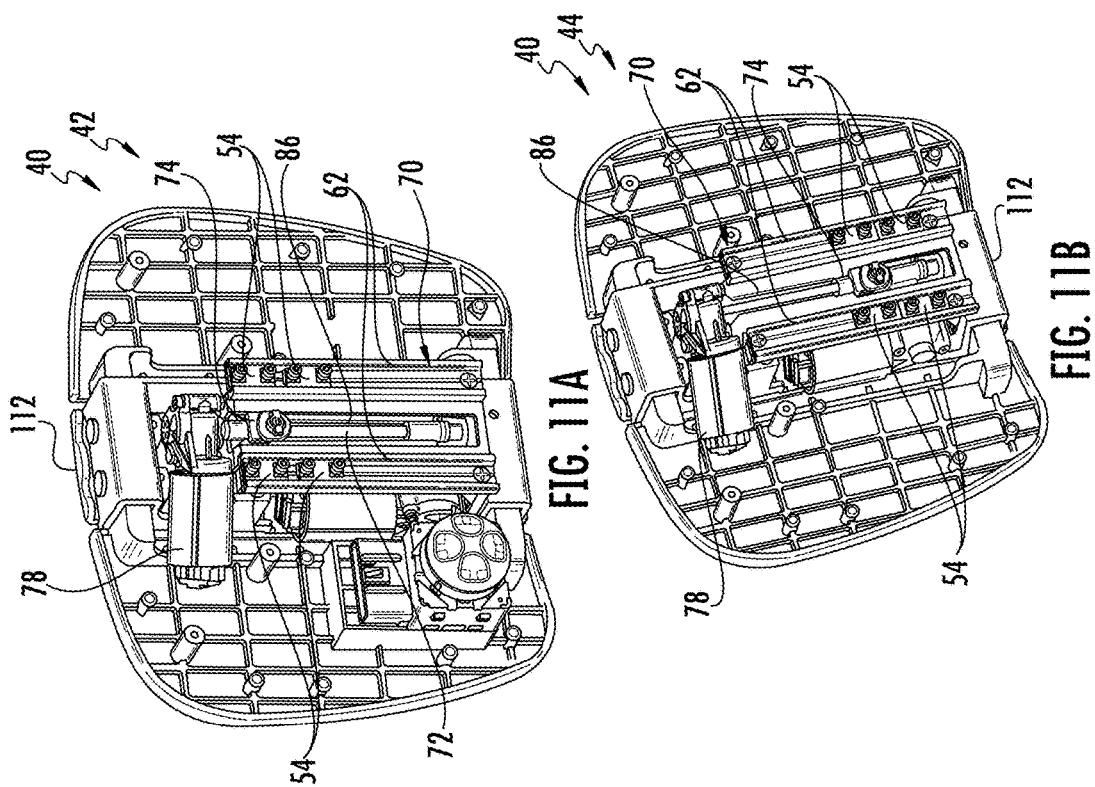

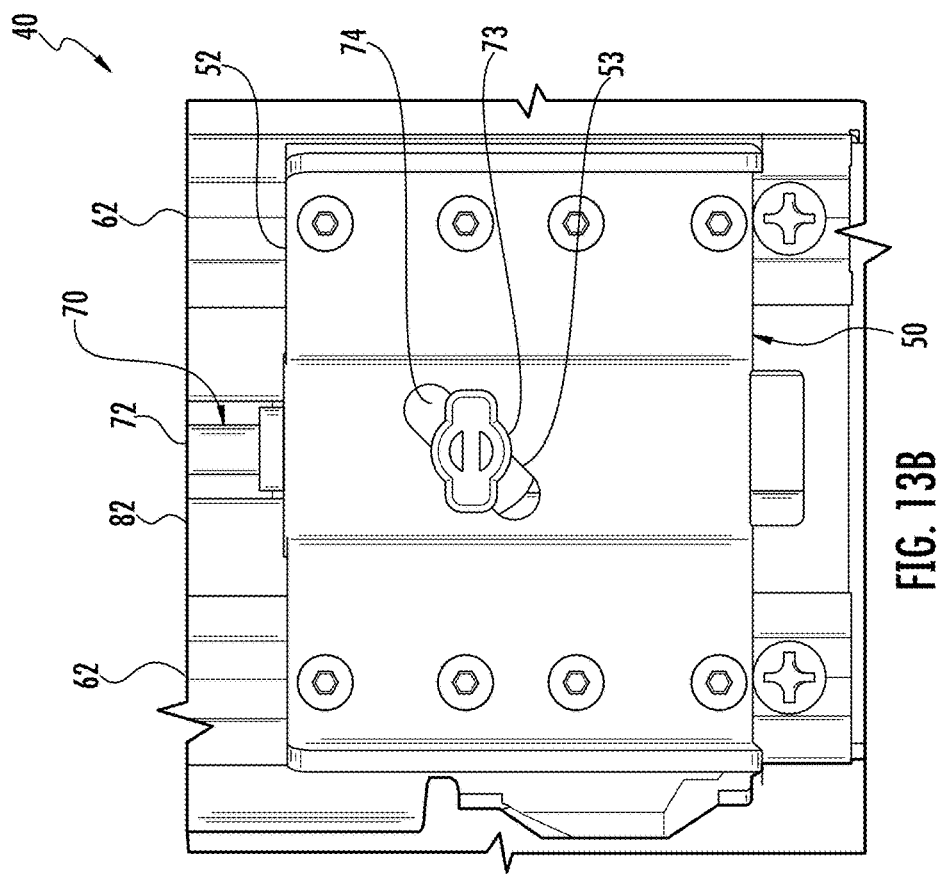
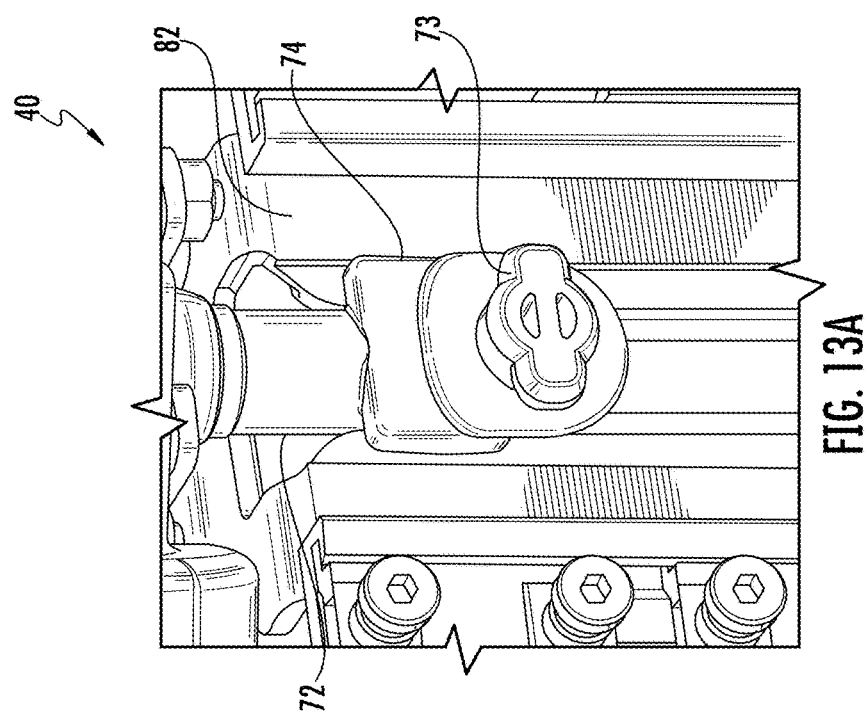

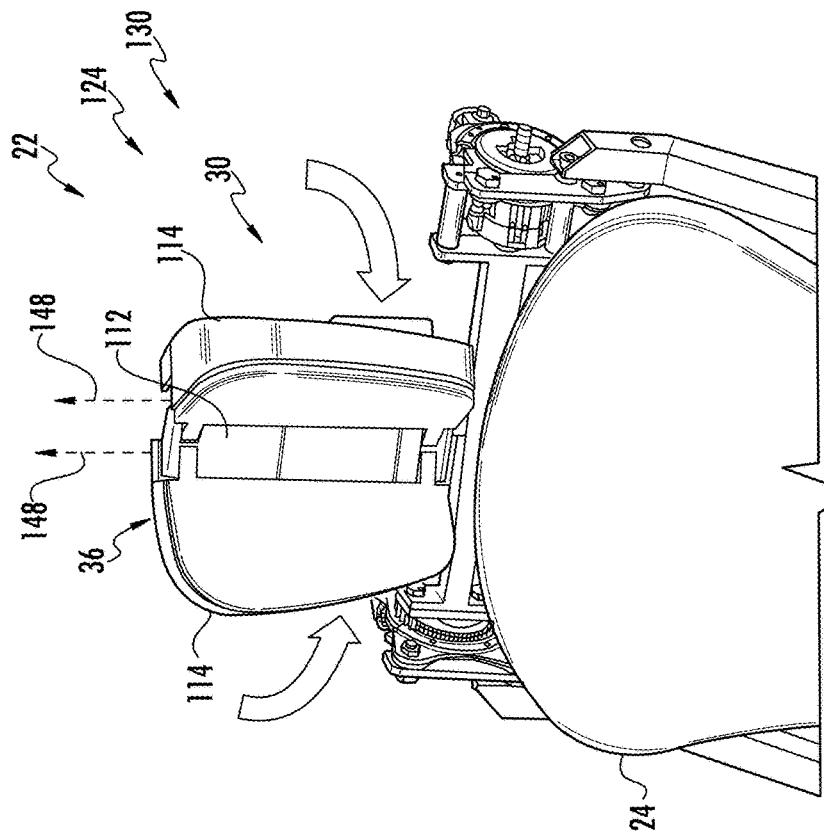
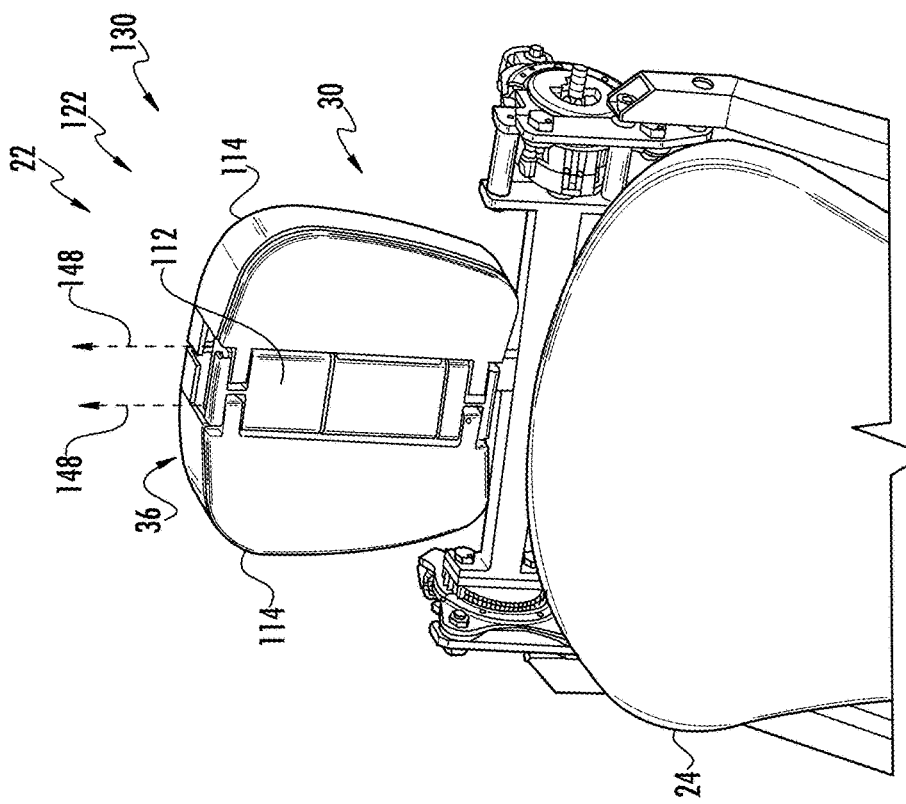

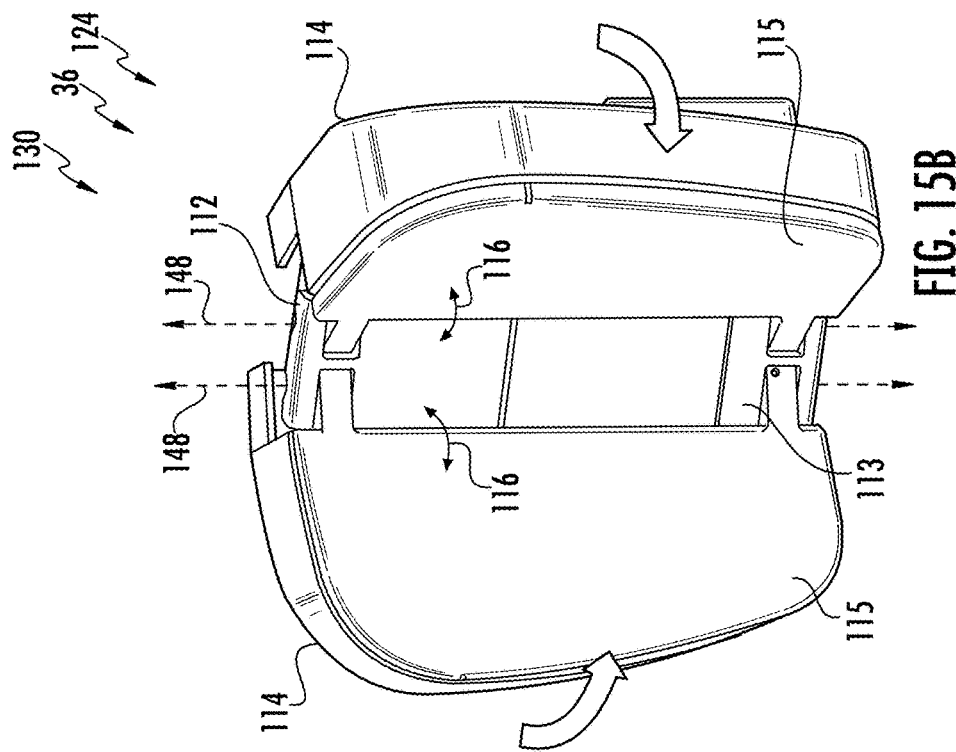
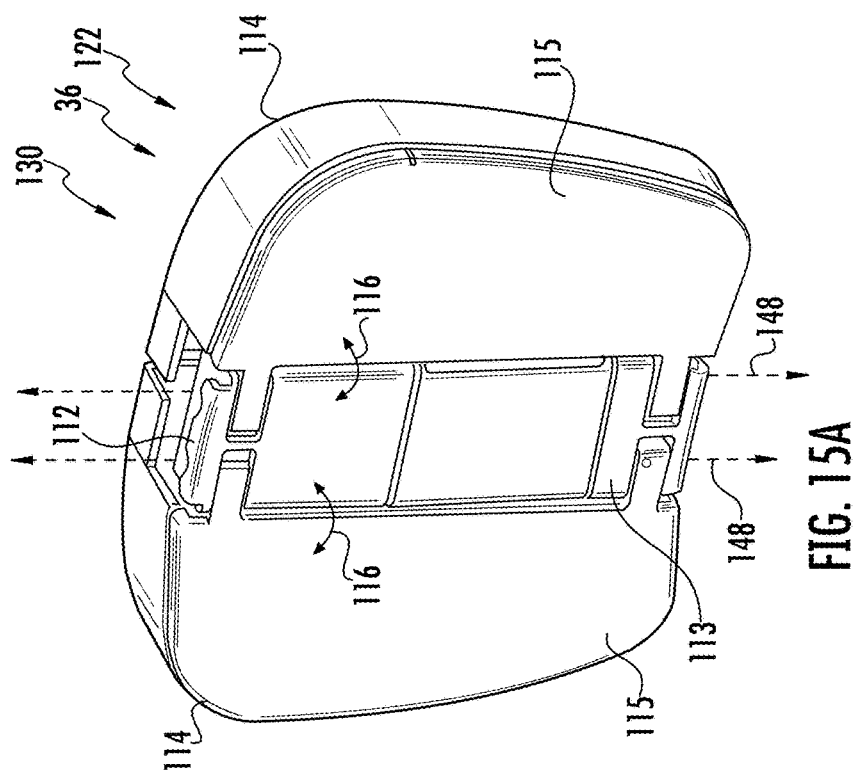

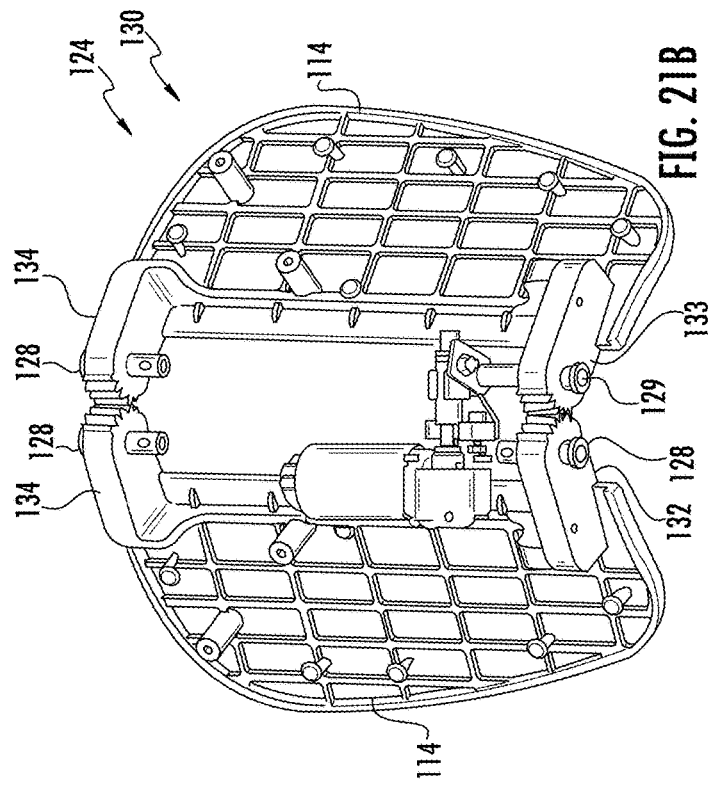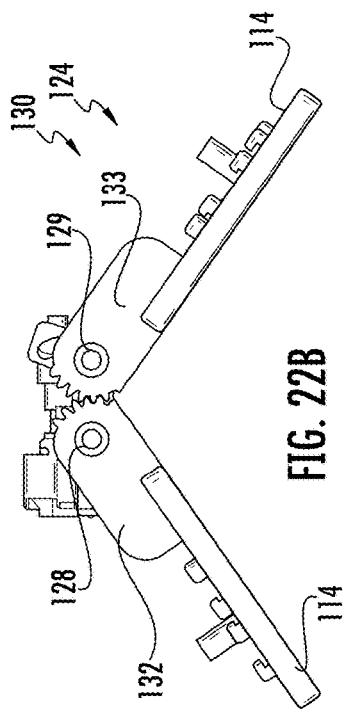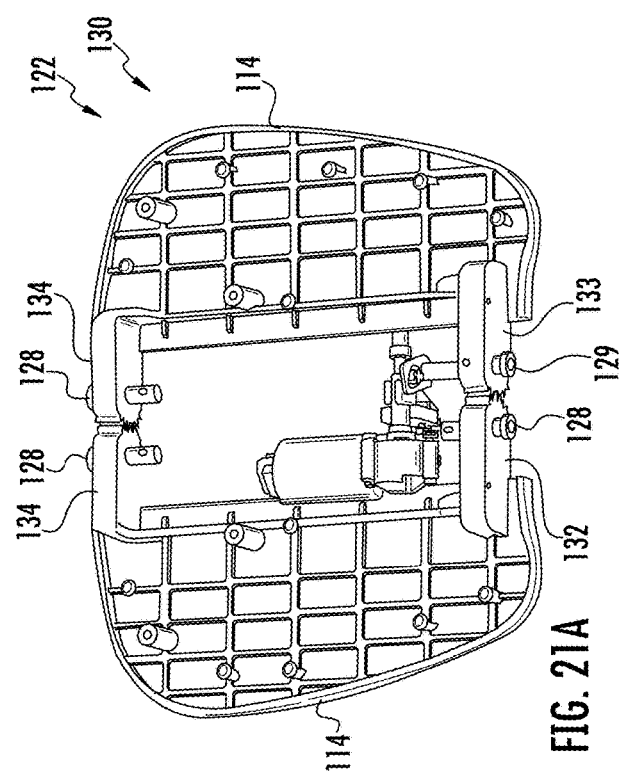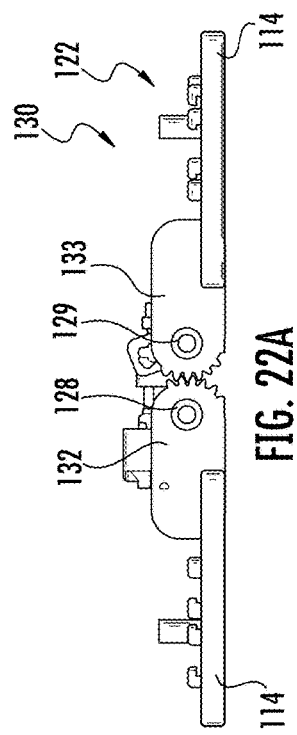

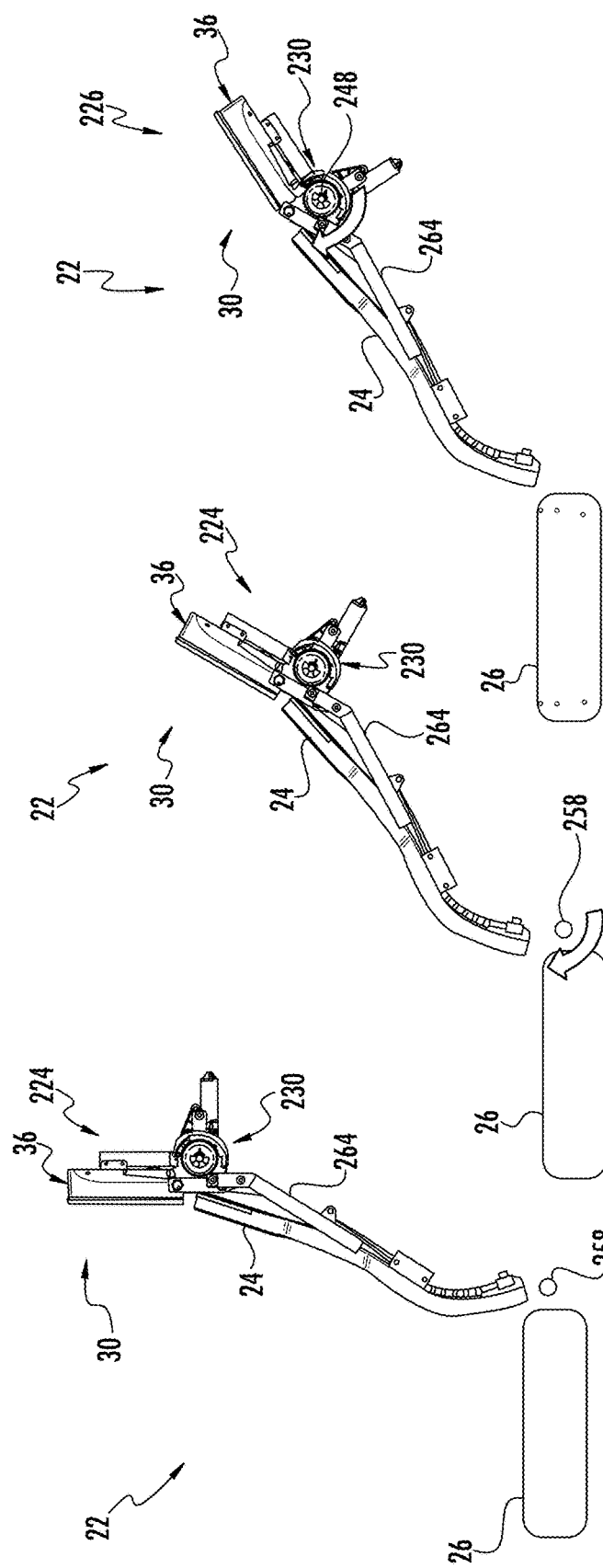

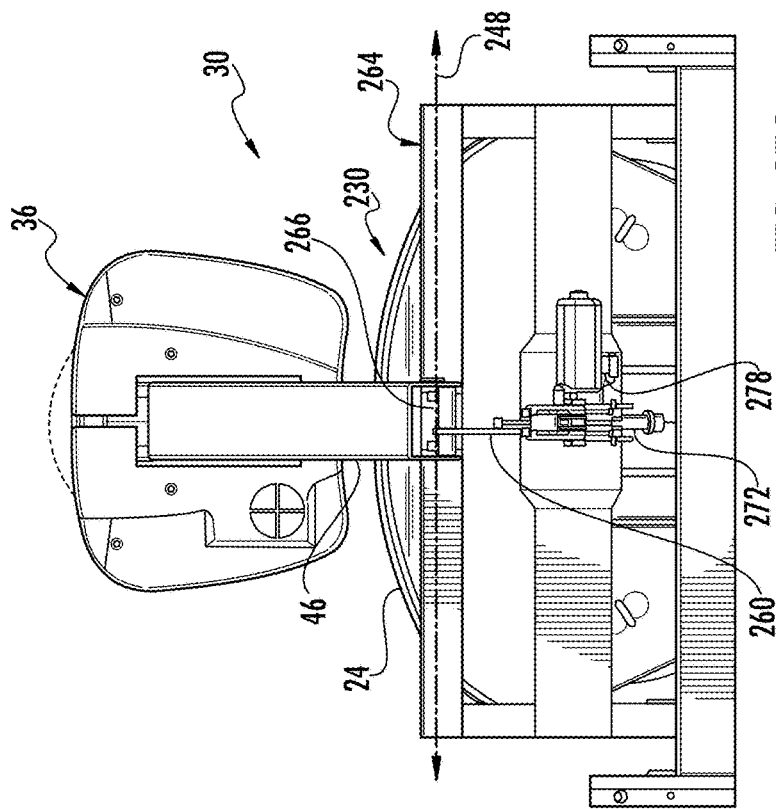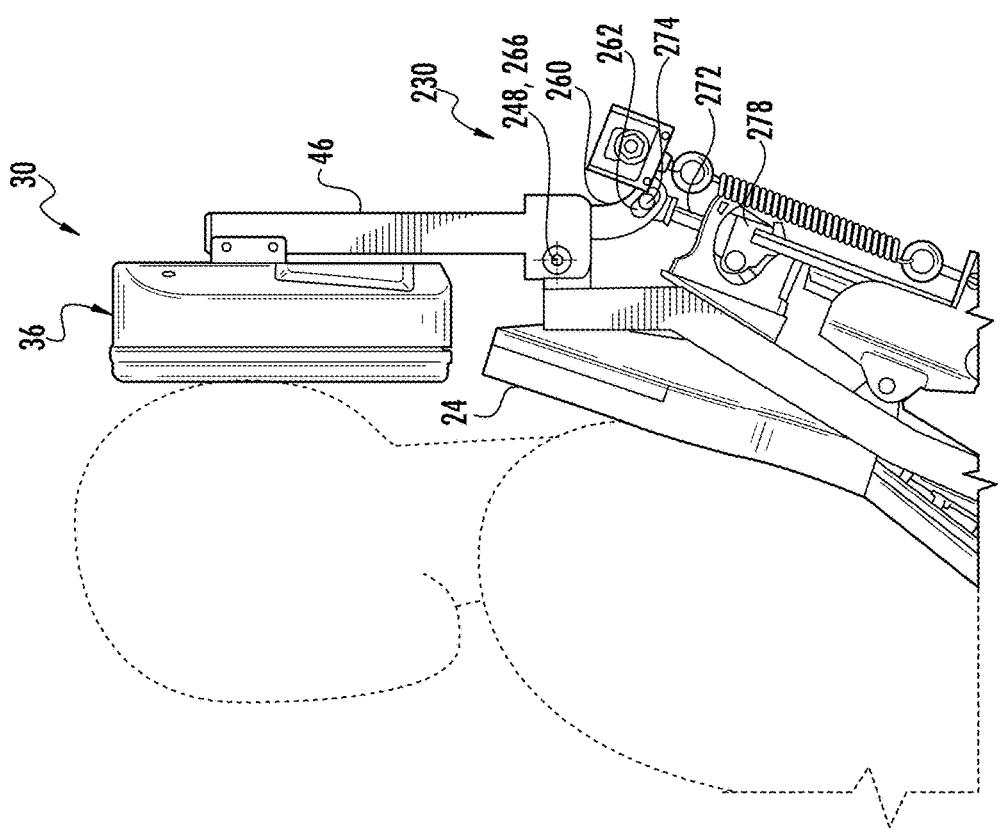

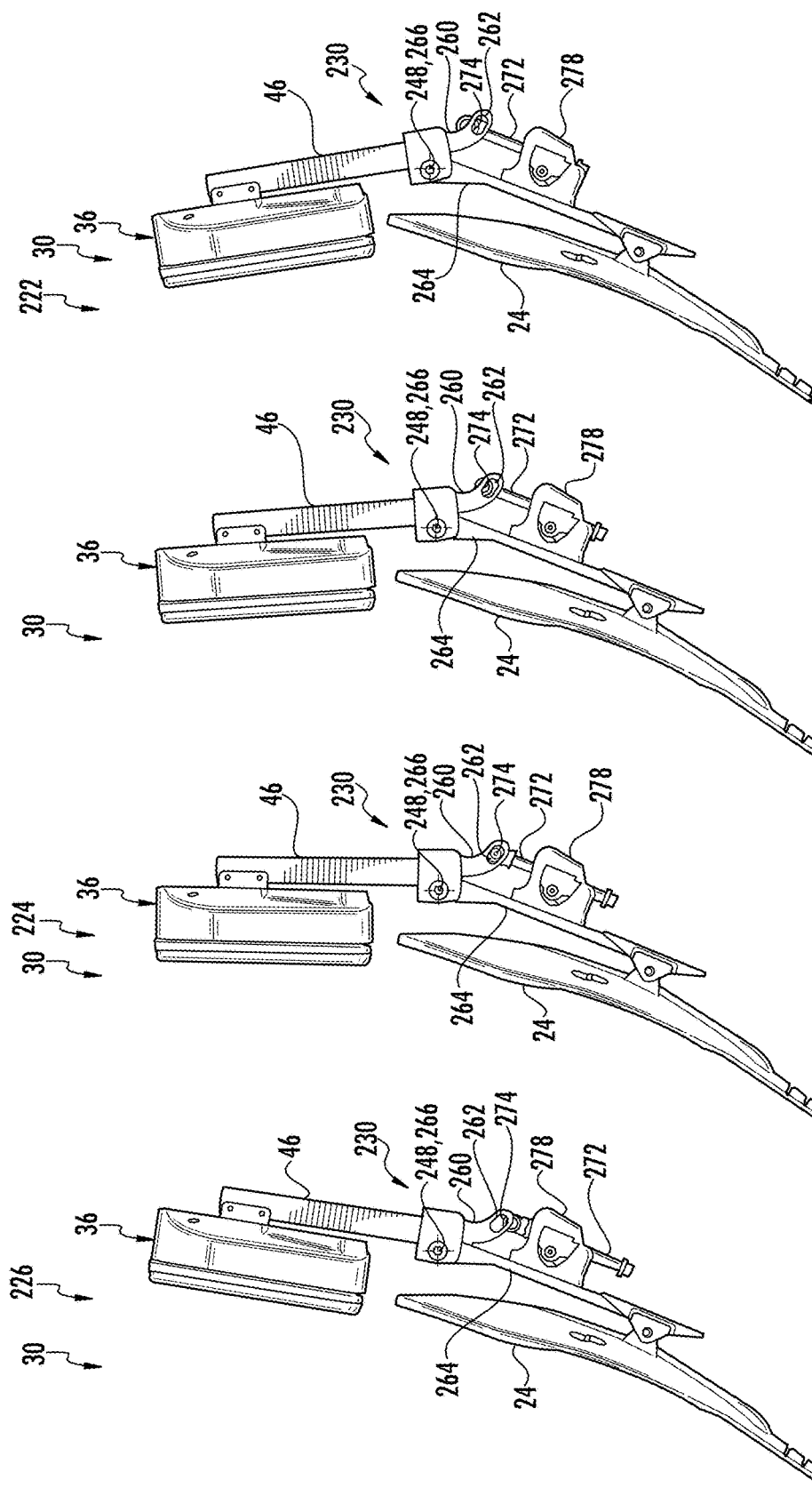

MULTI-ADJUSTABLE HEAD RESTRAINT

CROSS-REFERENCE TO RELATED PATENT APPLICATIONS

This application claims priority to and the benefit of U.S. Provisional Patent Application No. 62/302,783, filed Mar. 2, 2016, the entire disclosure of which is incorporated herein by reference.

FIELD

The disclosure relates generally to adjustable head restraint assemblies for a seat back of a seat.

BACKGROUND

Head restraints often are used in a vehicle to protect and/or position the head and neck of the vehicle occupant. It is desirable to improve the adjustability of current head restraints to achieve optimal head and neck position during normal use and while the vehicle seat is reclined.

SUMMARY

Various embodiments provide for an adjustable head restraint assembly for a seat back of a seat that includes a head supporting structure, a head rest support, and at least two of a height adjustment mechanism, a side angle adjustment mechanism, and a tilt adjustment mechanism that are each electronically powered. The head supporting structure is configured to support an occupant's head. The head rest support supports the head supporting structure and is configured to attach the head supporting structure to the seat back. The height adjustment mechanism is configured to change the height of the head supporting structure relative to the head rest support and the seat back. The side angle adjustment mechanism is configured to change the angle of side portions of the head supporting structure relative to a center portion of the head supporting structure. The tilt adjustment mechanism is configured to change a tilt angle of the head supporting structure relative to a tilt supporting structure and the seat back.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Features, aspects, and advantages of the present invention will become apparent from the following description and the accompanying exemplary embodiments shown in the drawings, which are briefly described below.

FIG. 4A is a perspective front view of the head restraint of FIG. 3 in a low vertical position.

FIG. 4B is a perspective front view of the head restraint of FIG. 3 in a high vertical position.

FIG. 5A is a perspective rear view of the height adjustment mechanism of the head restraint of FIG. 3 in a low vertical position.

FIG. 5B is a perspective rear view of the height adjustment mechanism of the head restraint of FIG. 3 in a high vertical position.

FIG. 9 is a perspective rear view of the height adjustment mechanism of a portion of the head restraint of FIG. 3 in a high vertical position and with the rear cover removed.

FIG. 10 is a bottom cross-sectional view of a portion of the height adjustment mechanism of the head restraint of FIG. 3 and with the rear cover removed.

FIG. 11A is a perspective rear view of the height adjustment mechanism of the head restraint of FIG. 3 in a low vertical position and with the rear cover and a portion of the mounting bracket removed.

FIG. 11B is a perspective rear view of the height adjustment mechanism of the head restraint of FIG. 3 in a high vertical position and with the rear cover and a portion of the mounting bracket removed.

FIG. 11C is a close-up view of a portion of the height adjustment mechanism of the head restraint of FIG. 3.

FIG. 13A is a perspective view of the nut of the height adjustment mechanism of the head restraint of FIG. 3 with the mounting bracket removed.

FIG. 13B is a rear view of the nut and mounting bracket of the height adjustment mechanism of the head restraint of FIG. 3.

FIG. 14A is a perspective front view of the head restraint of FIG. 3 with the side portions in a rearward position.

FIG. 14B is a perspective front view of the head restraint of FIG. 3 with the side portions in a forward position.

FIG. 15A is a perspective front view of the head restraint of FIG. 3 with the side portions in the rearward position.

FIG. 15B is a perspective front view of the head restraint of FIG. 3 with the side portions in the forward position.

FIG. 21A is a perspective rear view of the side angle adjustment mechanism of the head restraint of FIG. 3 with the side portions in the rearward position and with the rear cover, the height adjustment mechanism, and the center portion removed.

FIG. 21B is a perspective rear view of the side angle adjustment mechanism of the head restraint of FIG. 3 with the side portions in the forward position and with the rear cover, the height adjustment mechanism, and the center portion removed.

FIG. 22A is a bottom view of the side angle adjustment mechanism of the head restraint of FIG. 3 with the side portions in the rearward position and with the rear cover, the height adjustment mechanism, and the center portion removed.

FIG. 22B is a bottom view of the side angle adjustment mechanism of the head restraint of FIG. 3 with the side portions in the forward position and with the rear cover, the height adjustment mechanism, and the center portion removed.

FIG. 26A is a side view of the tilt adjustment mechanism of FIG. 24A on a seat with the head restraint in the upright position and the seat back in an upright recline position.

FIG. 26B is a side view of the tilt adjustment mechanism of FIG. 24A on the seat with the head restraint in the upright position and the seat back in a lowered recline position.

FIG. 26C is a side view of the tilt adjustment mechanism of FIG. 24A on the seat with the head restraint in the rearward position and the seat back in the lowered recline position.

FIG. 27B is a side view of the tilt adjustment mechanism of FIG. 27A.

FIG. 27C is a rear view of the tilt adjustment mechanism of FIG. 27A.

FIG. 28A is a side view of the tilt adjustment mechanism of FIG. 27A in a rearward position.

FIG. 28B is a side view of the tilt adjustment mechanism of FIG. 27A in an upright position.

FIG. 28C is a side view of the tilt adjustment mechanism of FIG. 27A in a partially forward position.

FIG. 28D is a side view of the tilt adjustment mechanism of FIG. 27A in a forward position.

DETAILED DESCRIPTION

Referring generally to the figures, disclosed herein is an adjustable head restraint, as shown according to exemplary embodiments. The head restraint can have a combination of different adjustment mechanisms and accordingly can be adjusted in multiple different directions into a wide variety of positions relative to the seat back in order to provide optimal and customized support and comfort for the occupant's head and neck, during both normal use and while the vehicle seat is reclined.

According to one embodiment, the head restraint may be adjusted along at least two different dimensions or directions. More specifically, the height of the head restraint, the angle of the side portions of the head restraint, and/or the tilt of the head restraint can each be adjusted according to the preferences of the occupant.

Figure 1:
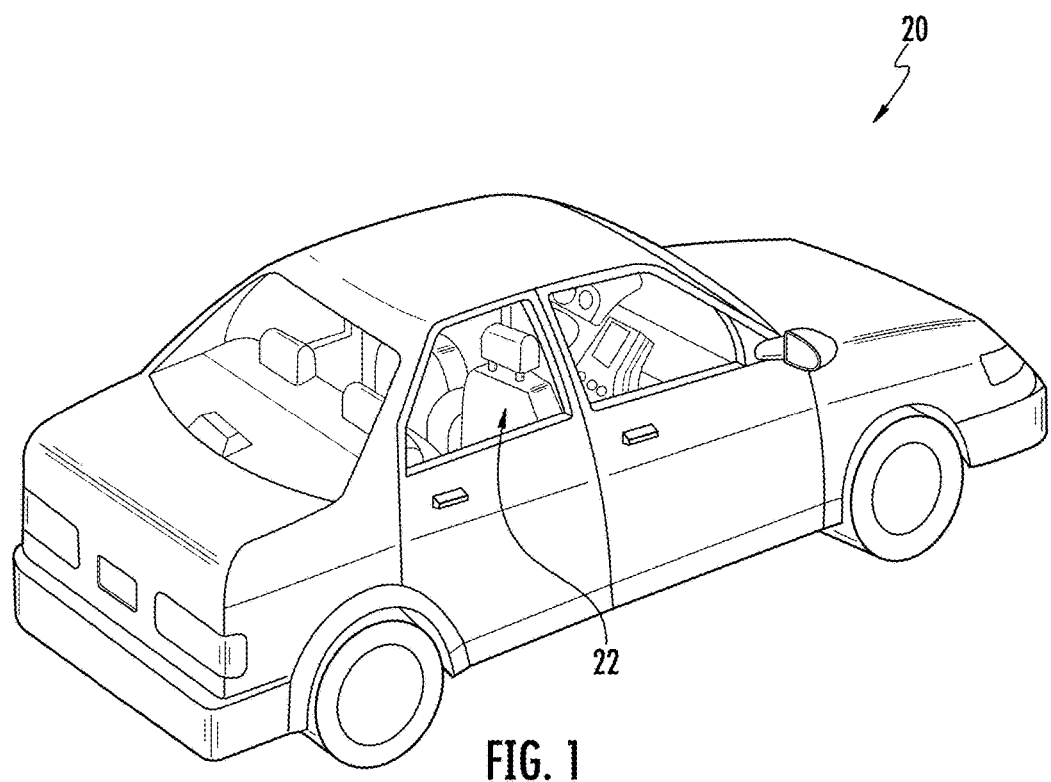
FIG. 1 is a perspective view of a vehicle according to one embodiment.

FIG. 1 illustrates an exemplary embodiment of a vehicle 20 with an automotive or vehicle seat 22 that may include the head restraint described herein. The vehicle 20 may include an interior passenger compartment containing a vehicle seat 22 for providing seating to an occupant. Although a four door sedan automobile is shown in FIG. 1, the head restraint may be used in a variety of applications, but is particularly useful with seats in any type of vehicle, such as a two door or four door automobile, a truck, a SUV, a van, a train, a boat, an airplane, or other suitable vehicular conveyance. Even more preferably, multiple head restraints described herein may be disposed on multiple different seats within the vehicle 20 to provide head support to multiple passengers within the vehicle 20.

Figure 2:
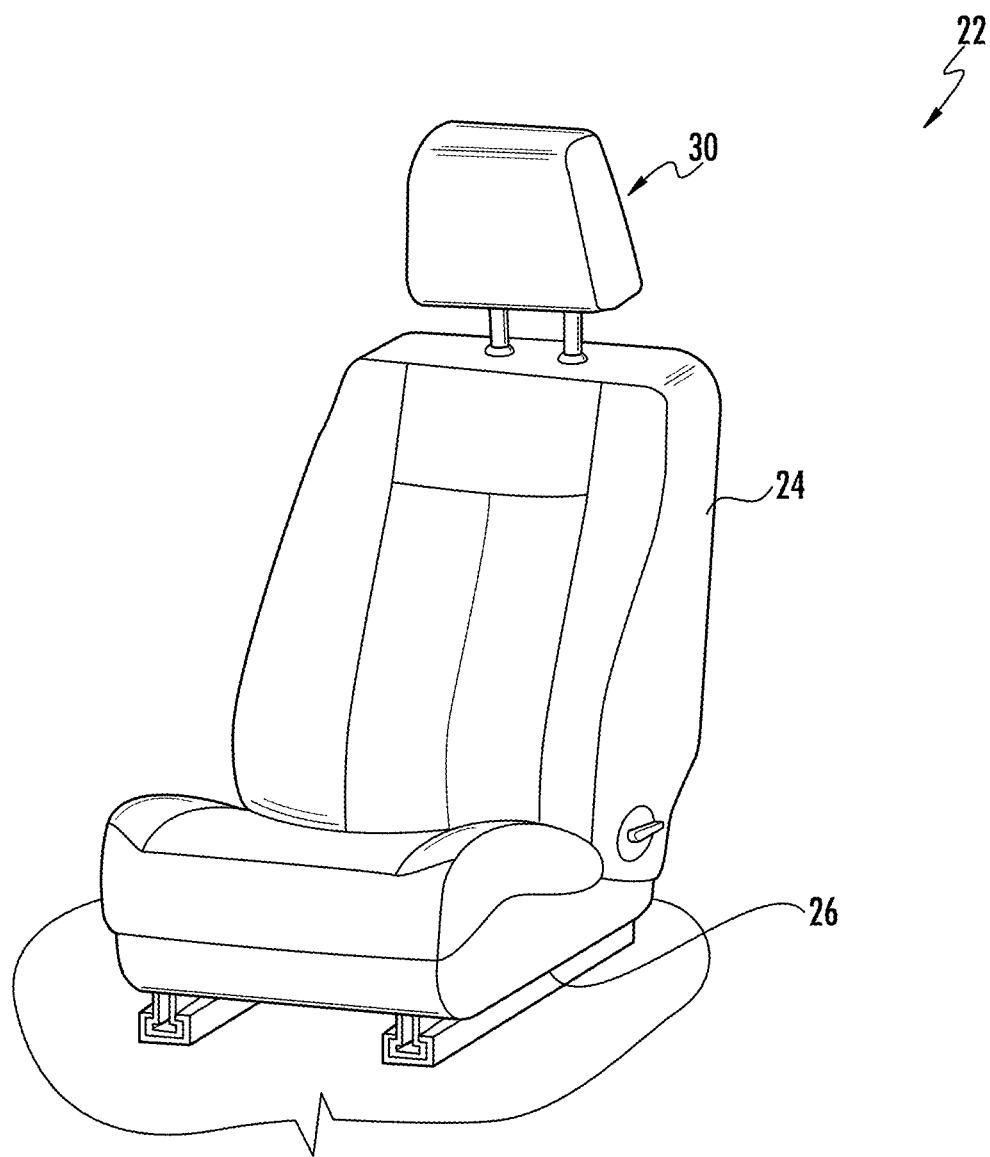
FIG. 2 is a perspective view of a vehicle seat that can be disposed in the vehicle of FIG. 1.

According to one embodiment of the present invention as depicted in FIG. 2, the vehicle seat 22 includes a seating assembly which may comprise a variety of components. For example, the seating assembly may include a seat back 24 and a seat bottom or cushion 26. The seat back 24 and the seat cushion 26 may useful for supporting the body of occupant of the seat 22. The vehicle seat 22 (as well as the seating assembly) may additionally include an adjustable head restraint or head rest assembly 30 (referred to herein for simplicity as a "head rest 30"), which may be used to provide support to the head of a passenger. The head rest 30 may be used with a variety of different seat backs 24 of a variety of different vehicle seats 22. As shown in FIG. 2, the head rest 30 may be attached to and located on a top portion of the seat back 24. Although the seat back 24 is referred to herein, it is understood that the head rest 30 may be attachable to and movable relative to other components within the vehicle 20, such as an external seat frame. The vehicle seat 22 may be a front row or back row seat within the vehicle 20.

Figure 3:
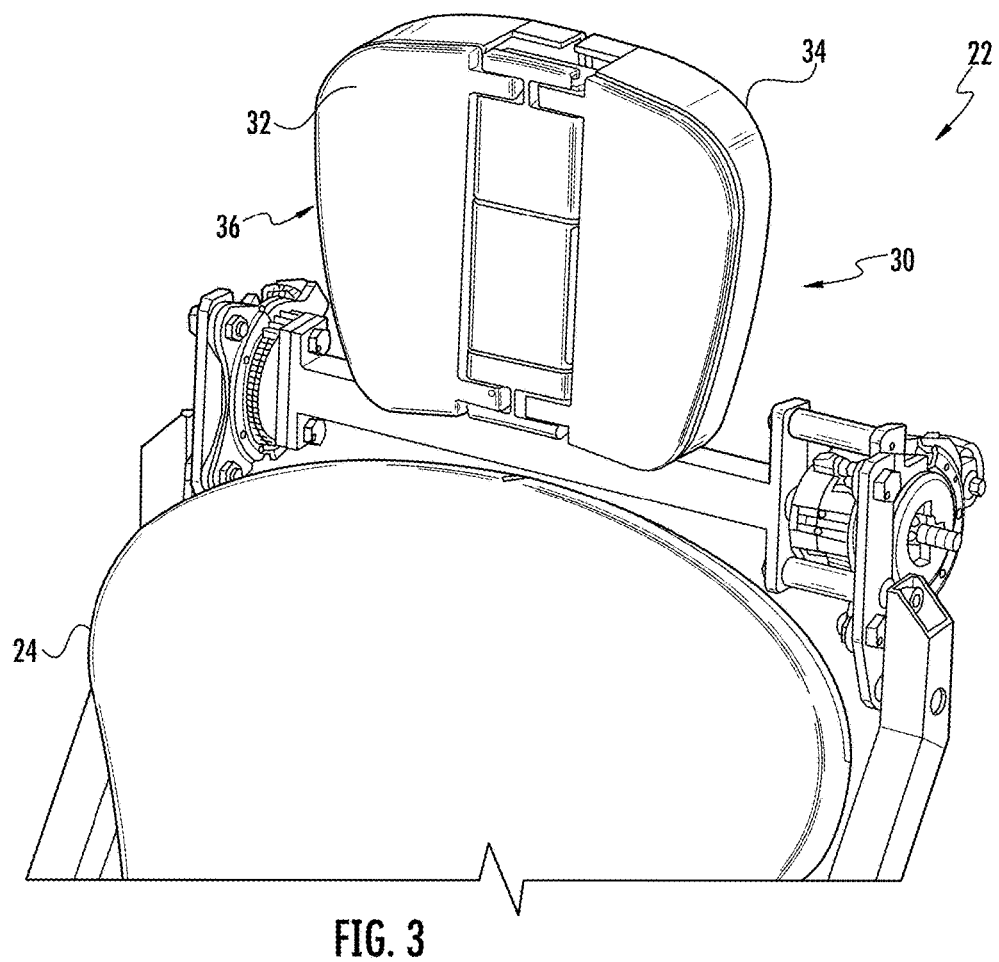
FIG. 3 is a perspective view of a head restraint according to one embodiment that can be disposed in the vehicle of FIG. 1.
Figure 6A:
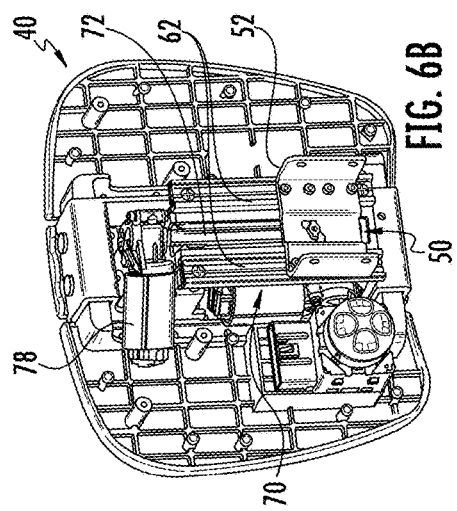
FIG. 6A is a perspective rear view of the height adjustment mechanism of the head restraint of FIG. 3 in a low vertical position and with the rear cover removed.
Figure 6B:
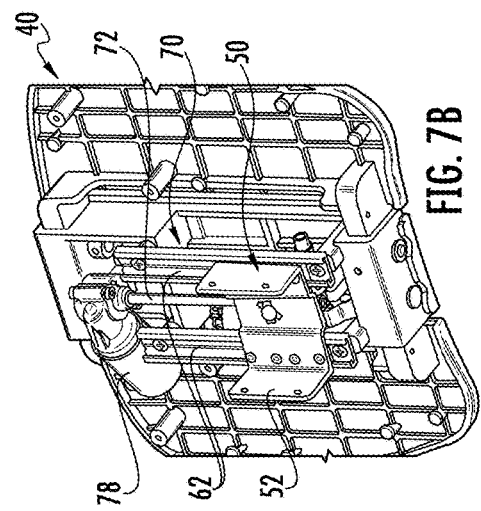
FIG. 6B is a perspective rear view of the height adjustment mechanism of the head restraint of FIG. 3 in a high vertical position and with the rear cover removed.
Figure 7A:
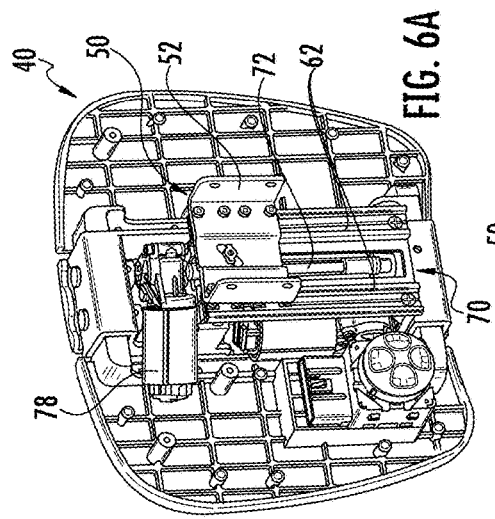
FIG. 7A is a perspective rear view of the height adjustment mechanism of the head restraint of FIG. 3 in a low vertical position and with the rear cover removed.
Figure 7B:
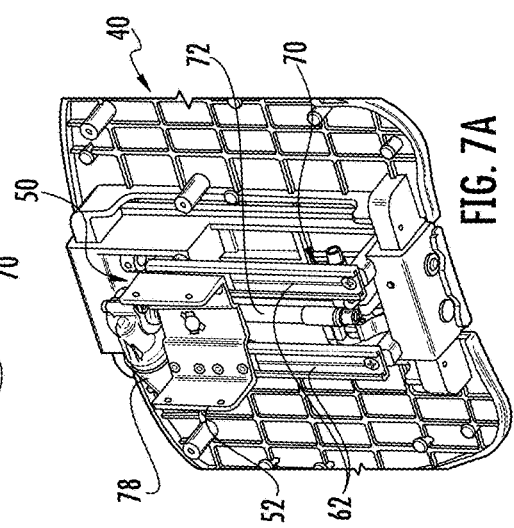
FIG. 7B is a perspective rear view of the height adjustment mechanism of the head restraint of FIG. 3 in a high vertical position and with the rear cover removed.
Figures 8A, 8B:
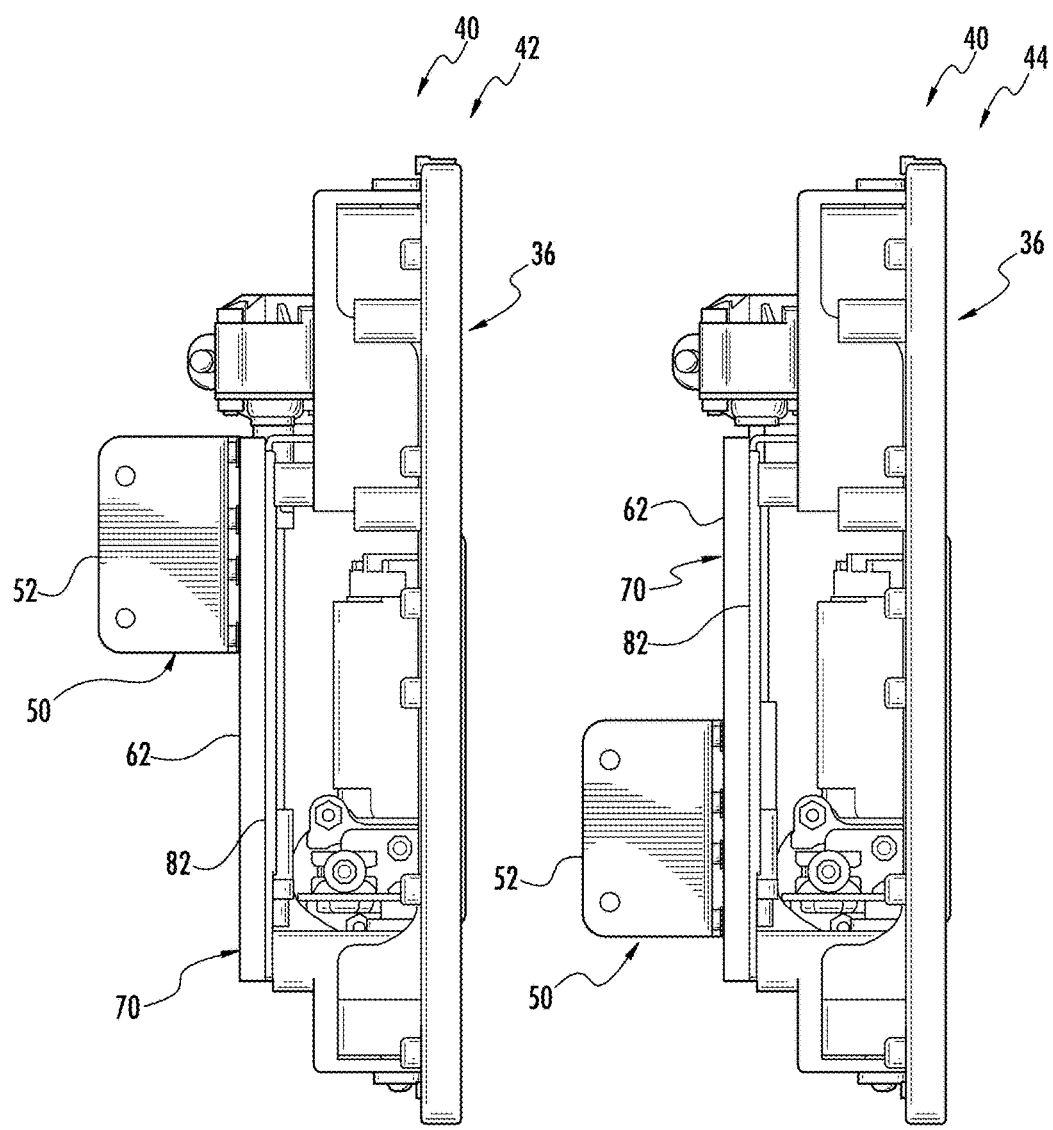
FIG. 8A is a side view of the height adjustment mechanism of the head restraint of FIG. 3 in a low vertical position and with the rear cover removed.
FIG. 8B is a side view of the height adjustment mechanism of the head restraint of FIG. 3 in a high vertical position and with the rear cover removed.

Referring now to FIG. 3, there is shown one embodiment of the head rest 30, which may include a head supporting structure 36 configured to directly support the occupant's head. The head supporting structure 36 includes a front side or cover 32 that the occupant can directly rest their head on and a back side or rear cover 34 that faces the back of the vehicle 20.

Figure 24B:
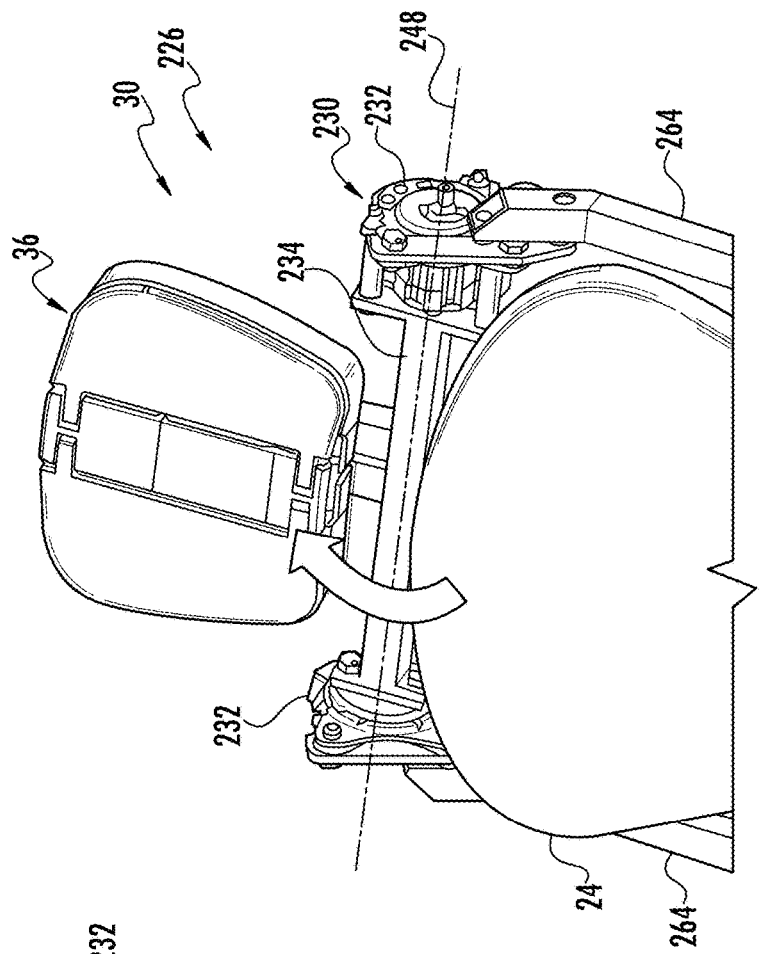
FIG. 24B is a perspective front view of the tilt adjustment mechanism of FIG. 24A in a rearward position.
Figure 24A:
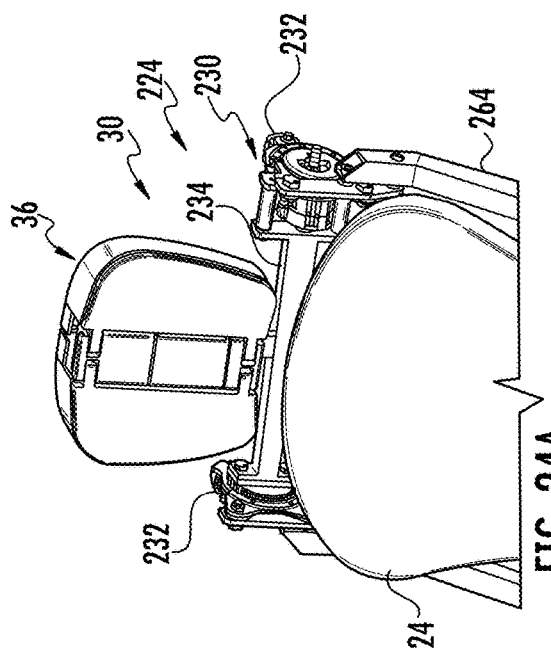
FIG. 24A is a perspective front view of a tilt adjustment mechanism of the head restraint of FIG. 3 in an upright position according to one embodiment.
Figure 24C:
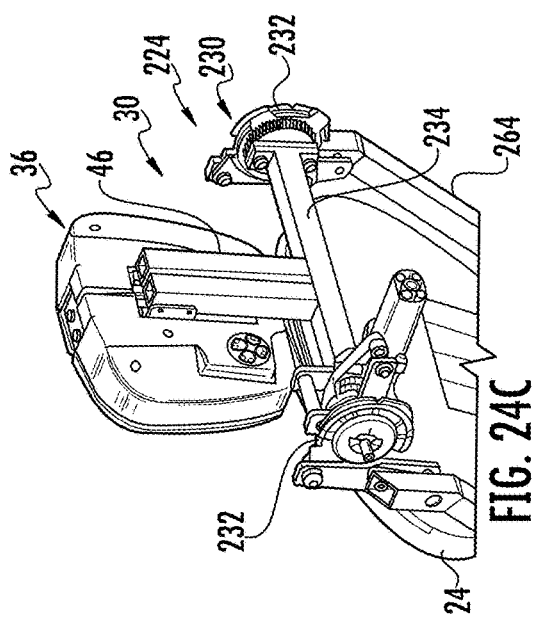
FIG. 24C is a perspective rear view of the tilt adjustment mechanism of FIG. 24A in the upright position.
Figure 25:
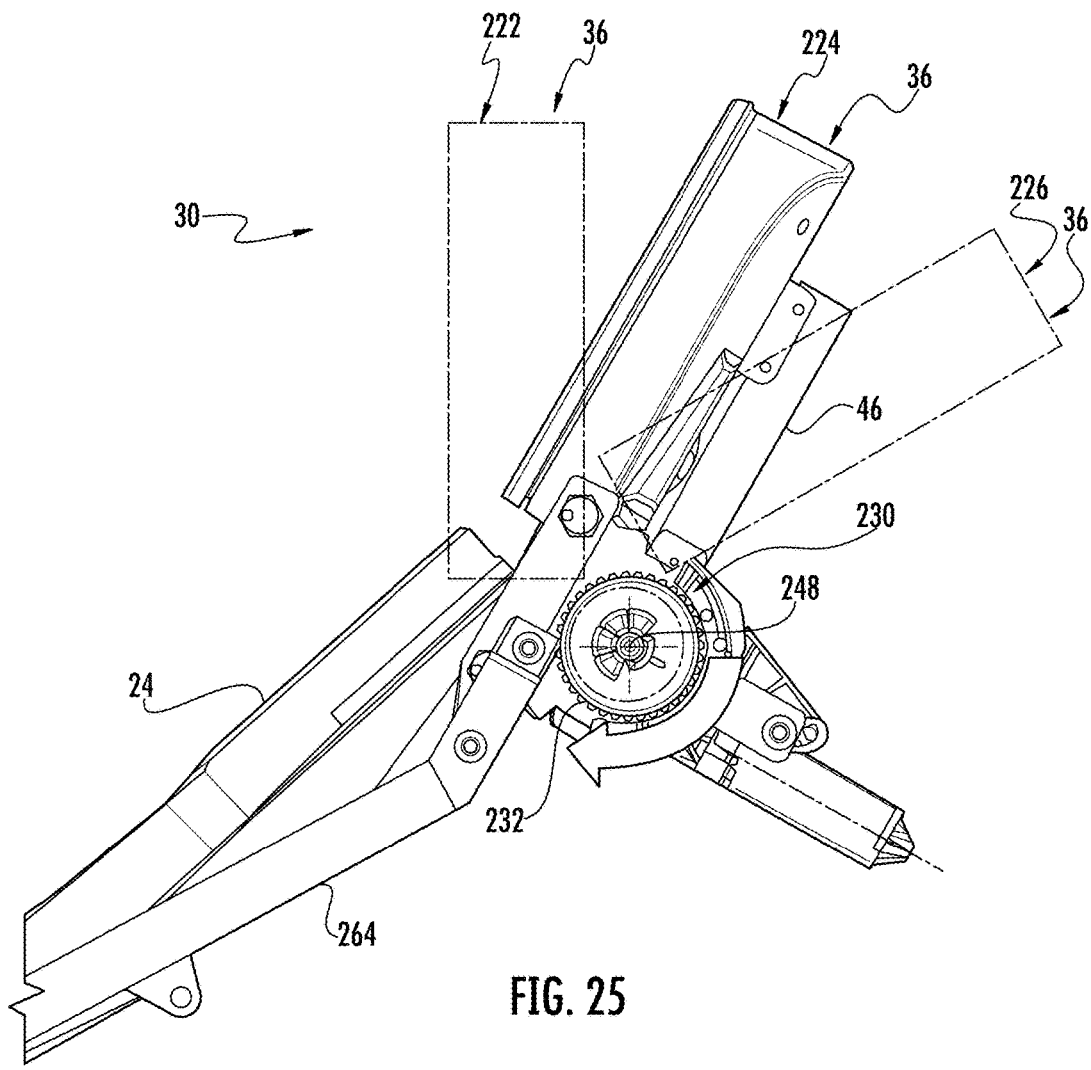
FIG. 25 is a side view of the tilt adjustment mechanism of FIG. 24A moving between a forward position, the upright position, and the rearward position.
Figure 27A:
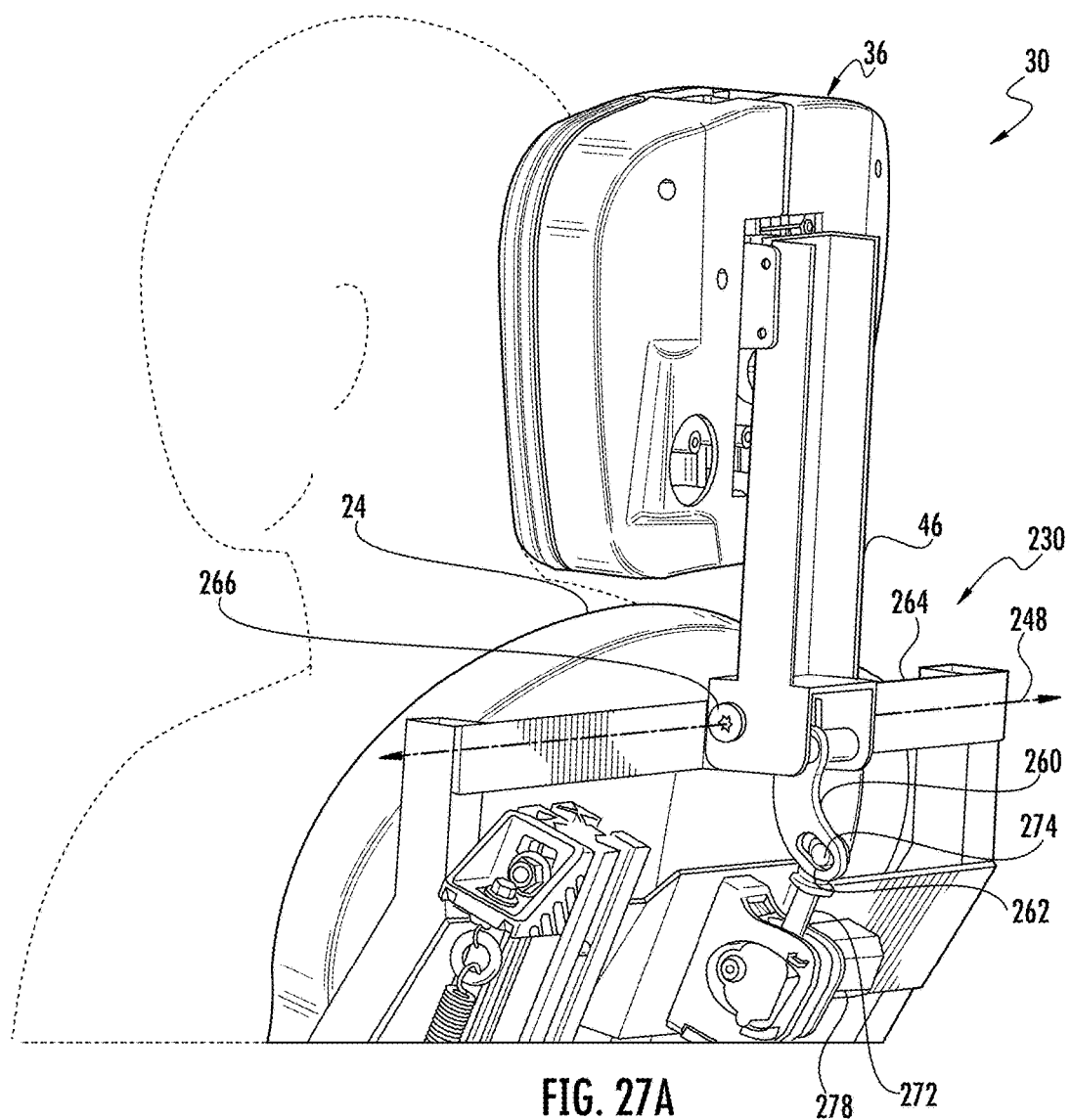
FIG. 27A is perspective rear view of a tilt adjustment mechanism of the head restraint of FIG. 3 according to another embodiment.

As shown in FIGS. 4B, 24C, and 27A, the head supporting structure 36 is attached to and supported by a head rest support 46, which is attached to the seat back 24. Accordingly, the head rest support 46 attaches the head supporting structure 36 to the seat back 24. The head rest support 46 may be configured to directly attach to the seat back 24 (or a part of the seat back 24) or may be configured to attach to, for example, an adjuster bar 234 or a tilt supporting structure 264 (as described further herein), which is attached to the seat back 24.

As described further herein, the head rest 30 can have a combination of different adjustment mechanisms and accordingly can be adjusted in multiple different directions in order to customize the support to the occupant and allow the occupant to choose their desired position during normal use as well as while the seat is reclined. The head rest 30 may include at least two of the three adjustment mechanisms such as a height adjustment mechanism 40, a side angle adjustment mechanism 130, and a tilt adjustment mechanism 230. As shown in FIGS. 4A-13B, the height of the head supporting structure 36 can be adjusted up and down along a substantially vertical axis 48 with the height adjustment mechanism 40. As shown in FIGS. 14A-23, the angle 116 of the side portions 114 of the head rest 30 can be adjusted forward and rearward about substantially vertical axes 148 with the side angle adjustment mechanism 130. As shown in FIGS. 24A-28D, the tilt angle of the head supporting structure 36 can be adjusted forward and backward about a substantially horizontal axis 248 with the tilt adjustment mechanism 230. The head rest 30 may optionally include all three of the height adjustment mechanism 40, the side angle adjustment mechanism 130, and the tilt adjustment mechanism 230. Each of the height adjustment mechanism 40, the side angle adjustment mechanism 130, and the tilt adjustment mechanism 230 may be independently controlled.

The various adjustment mechanisms may each be electronically powered such that the user can control the adjustment mechanisms with a button, a switch, or controls 38 located on the head rest 30, on the seat 22, on the door panel, or within a separate area of the vehicle 20 that is accessible to the occupant. According to one embodiment as shown in FIGS. 5A-5B, the controls 38 are positioned on the back of the head rest 30 along the rear cover 34 of the head supporting structure 36 to allow the occupant to conveniently access the controls 38 and adjust the head rest 30. All three adjustment mechanisms can be controlled with various buttons on the control 38.

Alternatively or additionally, the adjustment of the head rest 30 can be automatically controlled and directly tied to the position of the seat 22. For example, as the seat back 24 is reclined, the head rest 30 may automatically be adjusted to provide optimal support according to the position of the seat back 24.

Height Adjustment Mechanism

As shown in FIGS. 4A-13B, the head rest 30 includes the vertical or height adjustment mechanism 40. The height adjustment mechanism 40 is configured to change or adjust the height or vertical position of the head supporting structure 36 of the head rest 30 (i.e., the distance of the head supporting structure 36 from the seat back 24) relative to the head rest support 46 and the seat back 24. Accordingly, the height adjustment mechanism 40 allows the head supporting structure 36 to be adjusted up and down in the vertical direction in order to correspond with the height of the head of the occupant. Accordingly, the occupant may position the head supporting structure 36 in the exact desired position in relation to their head and neck.

The height adjustment mechanism 40 is configured to move the head supporting structure 36 between a low position 42 and a high position 44. In the low position 42, the head supporting structure 36 is relatively closer to the seat back 24, and in the high position 44, the head supporting structure 36 is relatively further from the seat back 24. Accordingly, as shown in FIG. 4A, the head supporting structure 36 of the head rest 30 can be positioned in the relatively low position 42 (e.g., closer to the top of the seat back 24) to accommodate shorter occupants. As shown in FIG. 4B, the head supporting structure 36 of the head rest 30 may be moved upward along a substantially vertical axis 48 and positioned in the relatively high position 44 (e.g., further from the top of the seat back 24) to accommodate taller occupants. The head supporting structure 36 may be adjusted back from the high position 44 to the low position 42 and further may be positioned in any region between the high position 44 and the low position 42 according to the occupant's preferences. The vertical axis 48 extends along the height of the head supporting structure 36, regardless of the position of the entire head rest 30 or the seat back 24 (e.g., if the head rest 30 is tilted or the seat back 24 is reclined, the vertical axis 48 still extends through the height of the head supporting structure 36).

FIGS. 5A-8B shows how the head supporting structure 36 of the head rest 30 can be adjusted vertically according to one embodiment. The height adjustment mechanism 40 includes a mounting bracket assembly 50 and a guiding assembly 70 that movably attach the head supporting structure 36 to the head rest support 46 (as shown in FIG. 4B). Accordingly, the head supporting structure 36 is supported by and can move vertically relative to the head rest support 46 and the seat back 24.

The mounting bracket assembly 50 and the guiding assembly 70 are movably attached to each other to movably attach the head support structure 36 to the head rest support 46. Each of the mounting bracket assembly 50 and the guiding assembly 70 may be vertically statically attached to either the head rest support 46 or the head supporting structure 36 according to the desired configuration. (It is understood that the "vertically static attachment" of the guiding assembly 70 indicates that the guiding assembly 70 and either the head rest support 46 or the head supporting structure 36 are not vertically movable relative to each other and that portions of the guiding assembly 70 (e.g., the first lead screw 72) can still move (e.g., rotate) relative to the head rest support 46 or the head supporting structure 36.)

For example, according to one embodiment as shown, the mounting bracket assembly 50 is statically attached to, positioned on or within, and vertically movable with the head rest support 46 and the guiding assembly 70 is vertically statically attached to, positioned on or within, and vertically movable with the head support structure 36. Accordingly, the mounting bracket assembly 50 is vertically movable relative to the head support structure 36 and the guiding assembly 70 is vertically movable relative to the head rest support 46. However, it is understood that, according to an alternative embodiment, the mounting bracket assembly 50 is statically attached to, positioned on or within, and vertically movable with the head support structure 36 and the guiding assembly 70 is vertically statically attached to, positioned on or within, and vertically movable with the head rest support 46.

The guiding assembly 70 is configured to move the mounting bracket assembly 50 in a vertical direction (where the vertical direction extends along the height of the head supporting structure 36 and parallel to the vertical axis 48). This vertical movement of the mounting bracket assembly 50 changes or adjusts the height of the head supporting structure 36. Accordingly, the guiding assembly 70 includes a first threaded pin, bolt, bar, or lead screw 72 and a first motor and transmission assembly 78.

The first lead screw 72 of the guiding assembly 70 may include external threads along its length and accordingly a nut 74 of the mounting bracket assembly 50 may be rotatably attached and threaded to the first lead screw 72. The vertical axis 48 extends through the middle of the first lead screw 72 such that the first lead screw 72 is rotatable about the vertical axis 48 and the head supporting structure 36 is vertically movable and adjustable parallel to the vertical axis 48.

The first motor and transmission assembly 78 is configured to turn, spin, or rotate the first lead screw 72 in order to move the mounting bracket assembly 50 in the vertical direction along the length of the first lead screw 72, which changes the height of the head supporting structure 36 relative to the head rest support 46. The first motor and transmission assembly 78 may rotate the first lead screw 72 through conventional mechanisms in order to adjust the height of the head supporting structure 36. The guiding assembly 70 may further include a motor bracket 82. The first motor and transmission assembly 78 may be attached to or mounted on the motor bracket 82 and attached to the first lead screw 72.

The mounting bracket assembly 50 includes a mounting bracket 52 and a nut 74 that are statically attached to each other. The mounting bracket 52 is statically attached to the head rest support 46 (or the head supporting structure 36, according to another embodiment). The nut 74 is movably attached or threaded to the first lead screw 72 of the guiding assembly 70. Accordingly, the nut 74 connects the mounting bracket 52 to the guiding assembly 70 (and the rest of the head supporting structure 36), as shown in FIG. 9. In order to movably attach to the first lead screw 72 of the guiding assembly 70, the nut 74 includes internal threads that are complementary to external threads of the first lead screw 72. The nut 74 may be an integral component that is one-piece of material. The nut 74 may be constructed out of a variety of different materials, including but not limited to plastic.

Figure 12A:
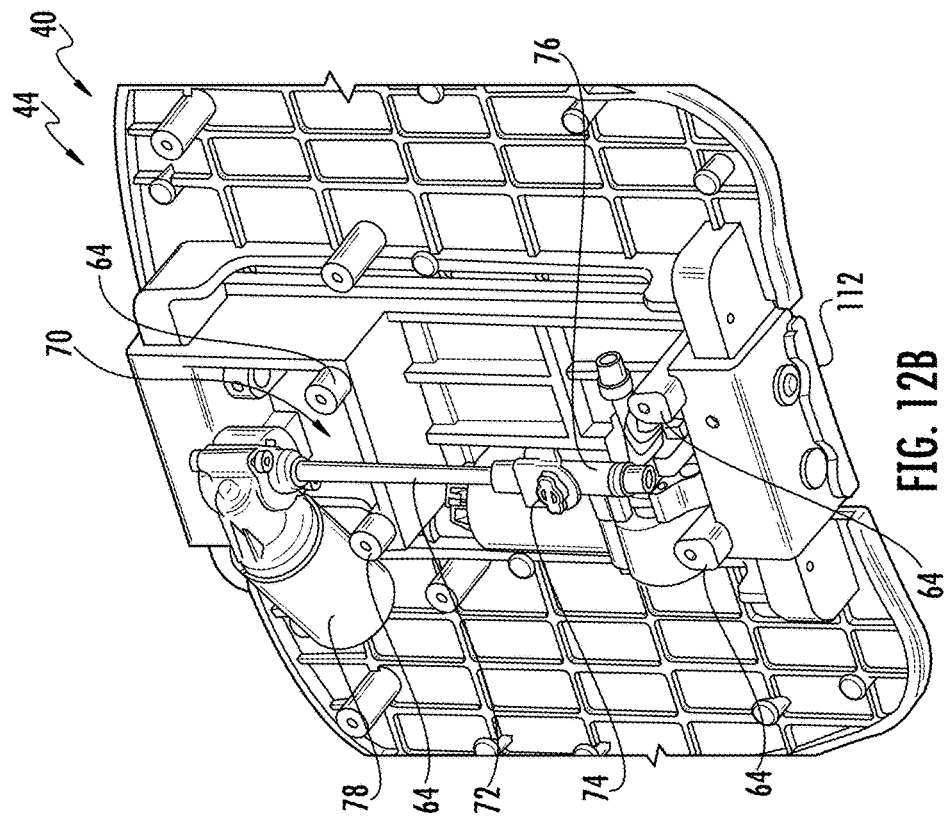
FIG. 12A is a perspective rear view of the height adjustment mechanism of the head restraint of FIG. 3 in a low vertical position and with the rear cover, the mounting bracket, the tracks, and the motor bracket removed.
Figure 12B:
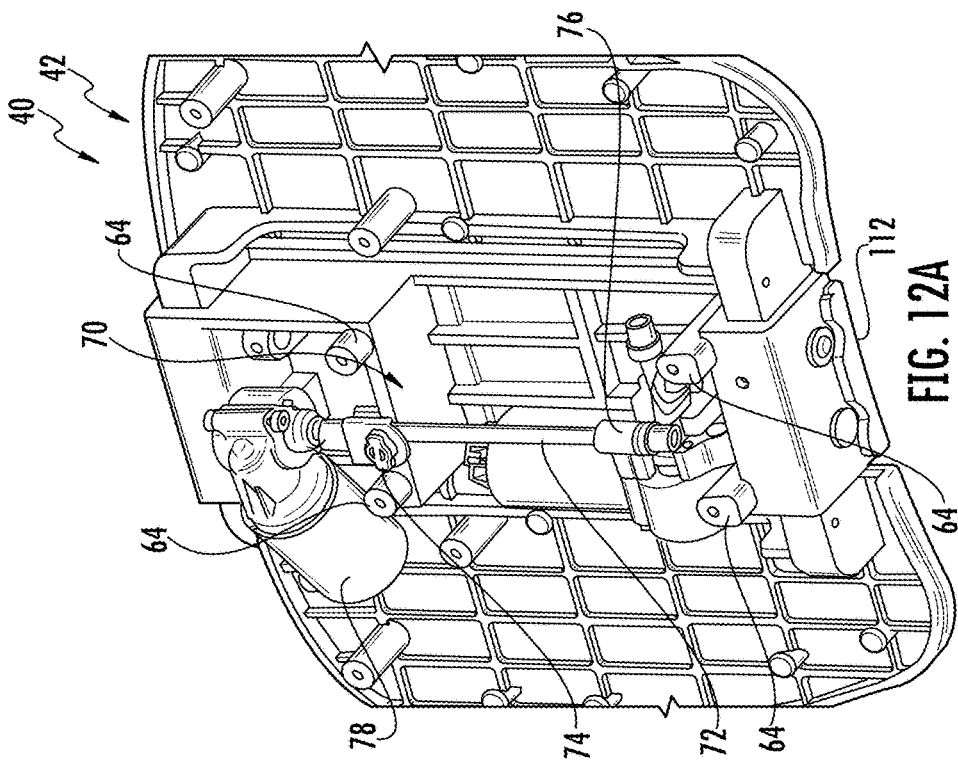
FIG. 12B is a perspective rear view of the height adjustment mechanism of the head restraint of FIG. 3 in a high vertical position and with the rear cover, the mounting bracket, the tracks, and the motor bracket removed.

In order to adjust the vertical height of the head supporting structure 36, the first motor and transmission assembly 78 rotates the first lead screw 72, which moves the nut 74 up and down along at least a portion of the length of the first lead screw 72, as shown in FIGS. 11A-11C. Since the nut 74 and the mounting bracket 52 are statically attached to each other, the nut 74 guides the mounting bracket 52 along the portion of the length of the first lead screw 72. The mounting bracket 52 (and thus the entire mounting bracket assembly 50) and the nut 74 move congruently together up and down along the length of the first lead screw 72 as the first lead screw 72 is rotated, as shown in FIGS. 12A-12B. Moving the mounting bracket assembly 50 along the length of the first lead screw 72 moves and vertically adjusts the entire head supporting structure 36 up and down relative to the head rest support 46 on the seat back 24 and controls the height adjustment of the head supporting structure 36 relative to the rest of the seat 22.

In order to guide the movement of the mounting bracket assembly 50 relative to the first lead screw 72, the guiding assembly 70 may further include one or more tracks 62. The mounting bracket 52 may be vertically movably attached to the tracks 62. As the first lead screw 72 is rotated and the nut 74 moves along the first lead screw 72 to adjust the height of the head supporting structure 36, the tracks 62 guide the mounting bracket 52 as the mounting bracket 52 moves along the length of the tracks 62 congruently with the movement of the nut 74. As shown in FIG. 9, two tracks 62 may be positioned on either side of the mounting bracket 52 and the first lead screw 72 in order to provide a secure and movable attachment between the mounting bracket 52 and the head supporting structure 36 and to prevent the mounting bracket assembly 50 from rotating in either direction with the first lead screw 72. According to one embodiment, the tracks 62 may be connected to a center portion 112 of the head supporting structure 36 through the motor bracket 82 (which may also be attached to the center portion 112 of the head supporting structure 36), as shown in FIGS. 9-10. As shown in FIGS. 9 and 12A-12B, the center portion 112 of the head supporting structure 36 may include four attachment points 64 to attach to the motor bracket 82 and the tracks 62 to the center portion 112.

In order to allow the mounting bracket 52 to move within the tracks 62, the mounting bracket 52 includes at least one slide or guide 54 that moves at least partially within the tracks 62, as shown in FIGS. 9-10. As shown in FIGS. 11A-11C, the mounting bracket 52 may include four guides 54 such that two guides 54 are positioned in each track 62 that are on each side of the first lead screw 72. As shown in FIG. 10, the guides 54 are positioned within a channel formed by the tracks 62. The guides 54 may be attached to the body of the mounting bracket 52 through a variety of different attachment mechanisms, such as screws, bolts, nuts, or rivets.

Additionally, the height adjustment mechanism 40 may include additional features in order to help control and guide the vertical movement of the head supporting structure 36 as well as to create a secure head rest assembly. For example, to control the vertical movement of the head supporting structure 36 as shown in FIGS. 12A-12B, either end of the first lead screw 72 may have at least one bushing or travel stop 76 that sets the length of travel of the nut 74 (and thus the mounting bracket assembly 50) along the first lead screw 72, which accordingly sets the amount that the head supporting structure 36 of the head rest 30 can be vertically adjusted. For example, the stop 76 may contact the nut 74 at a particular location along the first lead screw 72 in order to limit the movement of the nut 74 along the length of the first lead screw 72. To change the amount of potential height adjustment of the head supporting structure 36, the stop(s) 76 may be moved along the length of the first lead screw 72. Optionally, the point of attachment between the first lead screw 72 and the first motor and transmission assembly 78 may also function as a stop along one end of the first lead screw 72.

Additionally, the motor bracket 82 may help guide the movement of the nut 74 along the first lead screw 72 and support the nut 74 to prevent the nut 74 from rotating or moving out of alignment with the first lead screw 72, thus guiding the vertical movement of the head supporting structure 36. For example, as shown in FIGS. 9 and 11A-11C, the motor bracket 82 of the guiding assembly 70 includes an aperture or guide region 86 that extends along a portion of the length of the motor bracket 82 and the first lead screw 72 and prevents the nut 74 from rotating as the first lead screw 72 rotates. The guide region is defined by two sides of the motor bracket 82. As shown in FIG. 10, the edges of the sides of the motor bracket 82 each define guides or extensions 84 that fit within or are received by respective recesses 75 on two opposite sides of the nut 74 such that the nut 74 fits within and is movable within the guide region 86 along a portion of the length of the motor bracket 82. Accordingly, both sides of the nut 74 overlap opposite surfaces of each extension 84. As shown in FIG. 10, the extensions 84 may be slightly recessed relative to the rest of the motor bracket 82 in order to further guide the nut 74.

The extensions 84 of the motor bracket 82 extend and are slidable within the recesses 75 of the nut 74, allowing the nut 74 to move vertically along a portion of the length of the motor bracket 82 within the guide region 86 as the first lead screw 72 is rotated. The interaction between the extensions 84 and the recesses 75 prevents the nut 74 from rotating and forces the nut 74 to instead stably move vertically along the first lead screw 72. Accordingly, as the nut 74 is moved by the first lead screw 72, the nut 74 moves along the motor bracket 82 in a stable manner.

Furthermore, in order to create and assemble a secure head rest assembly, the mounting bracket 52 may attach to the nut 74 (and thus the head supporting structure 36) through a keyed attachment to statically lock the mounting bracket 52 in place on the nut 74, as shown in FIGS. 13A-13B. For example, the mounting bracket 52 and the nut 74 may include a mounting bracket keying feature 53 and a nut keying feature 73, respectively, in order to securely attach with each other during assembly and remain attached during use. The mounting bracket keying feature 53 may be a keyed aperture, opening, or recess within the middle section of the mounting bracket 52. The nut keying feature 73 may be a protrusion on the outer surface of the nut 74 that is shaped and sized to fit within the mounting bracket keying feature 53 when the nut keying feature 73 and the mounting bracket keying feature 53 are at a particular angle relative to each other during assembly. The nut keying feature 73 may be taller than the thickness of the middle section of the mounting bracket 52 in order to lock to the mounting bracket 52.

According to one embodiment, while the nut 74 is position on the first lead screw 72, the mounting bracket 52 may be rotated relative to the nut 74 (and the first lead screw 72) in order to allow the nut keying feature 73 to fit within the mounting bracket keying feature 53 during assembly. Once the nut keying feature 73 is positioned within the mounting bracket keying feature 53, the mounting bracket 52 may be rotated relative to the nut 74 in order to align the mounting bracket 52 with the vertical axis 48 through the first lead screw 72, thus preventing the nut keying feature 73 from being removed from the mounting bracket keying feature 53 and locking the mounting bracket 52 and the nut 74 together. After the mounting bracket 52 has been attached and secured to the nut 74, the guides 54 (each positioned within the tracks 62) may be attached to the side regions of the mounting bracket 52.

Side Angle Adjustment Mechanism

As shown in FIGS. 14A-23, the head rest 30 includes the wing or side angle adjustment mechanism 130. The side angle adjustment mechanism 130 is configured to change the angle 116 of side portions 114 of the head supporting structure 36 relative to a center portion 112 of the head supporting structure 36 in order to provide optimal support for the occupant's head.

Accordingly, the head supporting structure 36 includes three supporting regions, sections, areas, or portions: the middle or center region, area, section, or portion 112 and two wings or side regions, areas, sections, or portions 114 that are each configured to support the occupant's head. The side portions 114 are positioned on either side of the center portion 112 and are rotatably attached to either side of the center portion 112. As shown in FIGS. 14A-23, the side angle adjustment mechanism 130 is configured to adjust or change the angle 116 of the side portions 114 of the head supporting structure 36 relative to the center portion 112 according to the occupant's preferences.

Each of the side portions 114 of the head supporting structure 36 provides a surface that the occupant can lean their head to the side on. Accordingly, the side angle adjustment mechanism 130 is configured to adjust, rotate, or pivot each of the side portions 114 of the head supporting structure 36 forward and rearward between a full rearward position 122 and a full forward position 124 relative to the center portion 112 in order to restrict or allow movement of the occupant's head to either side and to provide more or less side support to the occupant's head, according to the occupant's preference. As shown in FIGS. 15A-15B, the angle 116 between a front surface 115 of each of the side portions 114 and a front surface 113 of the center portion 112 is greater in the rearward position 122 than in the forward position 124. The side portions 114 may be moved between the rearward position 122 and the forward position 124 depending on the position of the seat back 24, for example. However, it is understood that the side portions 114 can be moved between the rearward position 122 and the forward position 124 for any reason, regardless of the position of the seat back 24.

More specifically, it may be desirable for the side portions 114 to be in the full rearward position 122 (as shown in FIG. 14A) while the occupant is sitting upright in the seat 22 in order to allow a greater range of movement of the occupant's head and to provide maximum visibility. In the full rearward position 122, the side portions 114 are rotated as far back as possible (relative to the front and back of the vehicle seat 22) such that the side portions 114 are substantially in line with the center portion 112 and the head supporting structure 36 is substantially flat (and not angled relative to the front surface 113 of the center portion 112). In the full rearward position 122, the head supporting structure 36 provides minimal side support to the occupant's head and maximizes how far the occupant can move their head from side to side.

However, while the seat back 24 is reclined, it may be desirable for the side portions 114 to be in the full forward position 124 (as shown in FIG. 14B) in order to provide lateral support on either side of the head supporting structure 36 for the occupant to lean their head on. In the full forward position 124, the side portions 114 are rotated as far forward as possible (relative to the front and back of the vehicle seat 22) such that the front surfaces 115 of the side portions 114 are angled relative to the front surface 113 of the center portion 112. In the full forward position 124, the head supporting structure 36 provides maximum side or lateral support to the occupant's head and minimizes how far the occupant can move their head from side to side.

As shown in FIGS. 14B, 15B, 16B, and 18B, the two side portions 114 may each rotate or pivot about respective vertical axes 148 between the rearward position 122 and the forward position 124. Each of the vertical axes 148 extends along the height of the head supporting structure 36, regardless of the position of the entire head rest 30 or the seat back 24 (e.g., if the head rest 30 is tilted or the seat back 24 is reclined, the vertical axis 148 still extends along the height of the head supporting structure 36). The vertical axes 148 can be parallel to each other and to the vertical axis 48. The side portions 114 may be rotated about the vertical axes 148 in order to be positioned in any region between the rearward position 122 and the forward position 124.

One of the side portions 114 may include a drive gear mechanism 133 and the other of the side portions 114 may include a slave gear mechanism 132 that is complementary to and interlocks with the drive gear mechanism 133 (as described further herein). Accordingly, rotation of the one of the side portions 114 causes the other of the side portions 114 to rotate congruently. Therefore, the side angle adjustment mechanism 130 only needs to rotate one of the side portions 114 to cause both of the side portions 114 to rotate the same amount and the angle 116 between each of the front surfaces 115 of the side portions 114 and the front surface 113 of the center portion 112 is equal to provide a symmetrical surface for the user to rest their head on, as shown in FIG. 15B.

In order to adjust the angle 116 of the side portions 114 relative to the center portion 112, the side angle adjustment mechanism 130 may include a second threaded pin, bolt, bar, or lead screw 172 and a second motor and transmission assembly 178. The second lead screw 172 may include external threads along its length and accordingly a nut 174 (with internal threads) may be rotatably attached and threaded to the second lead screw 172.

The second motor and transmission assembly 178 is configured to turn, spin, or rotate the second lead screw 172 in order to cause the side portions 114 to rotate relative to the center portion 112. The second motor and transmission assembly 178 may rotate the second lead screw 172 through conventional mechanisms in order to move or adjust the angle 116 of the two side portions 114 relative to the center portion 112. The second motor and transmission assembly 178 may be attached to or mounted on the center portion 112 and attached to the second lead screw 172.

In order to adjust the angles 116 of the two side portions 114 relative to the center portion 112, the motor and transmission assembly rotates the second lead screw 172, which moves a motor nut 174 back and forth along at least a portion of the length of the second lead screw 172, as shown in FIGS. 18A-20B. The linear movement of the nut 174 along the second lead screw 172 causes the side portions 114 to rotate relative to the center portion 112.

The nut 174 includes internal threads that are complementary to external threads of the second lead screw 172 such that the nut 174 is movably attached to the second lead screw 172. The nut 174 may be an integral component that is one-piece of material. The nut 174 may be constructed out of a variety of different materials, including but not limited to plastic.

Figure 18A:
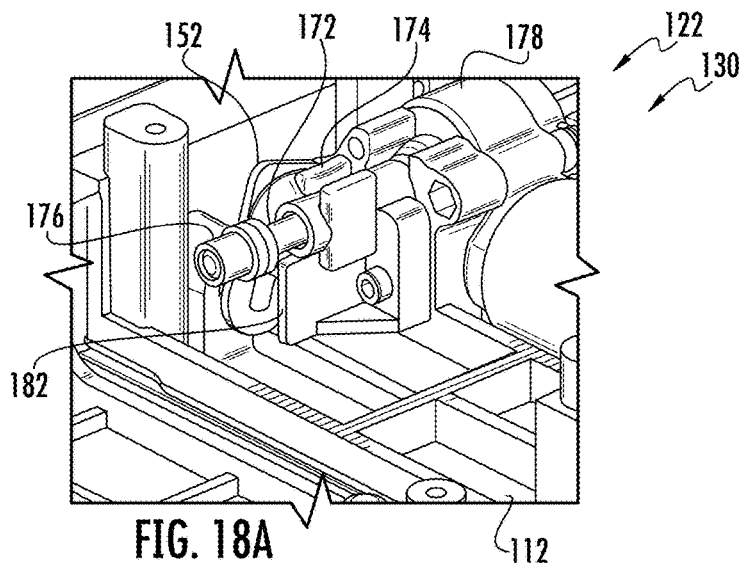
FIG. 18A is a perspective rear top view of the side angle adjustment mechanism of the head restraint of FIG. 3 with the side portions in the rearward position.
Figure 18B:
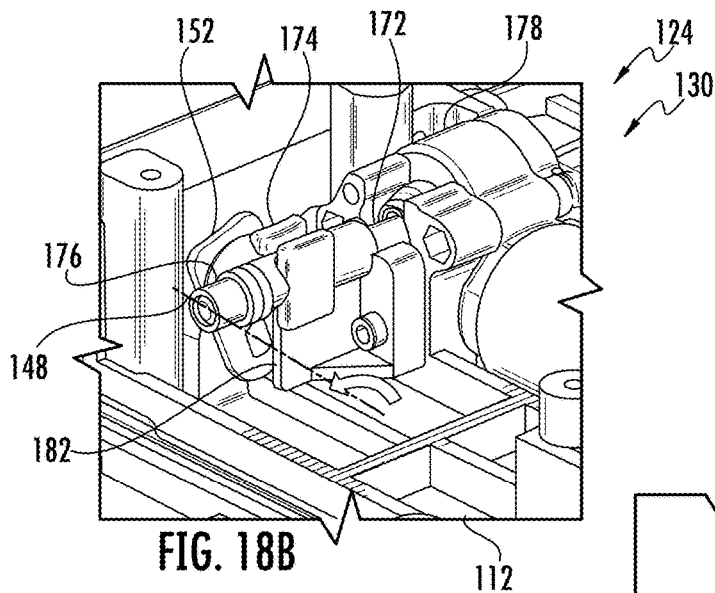
FIG. 18B is a perspective rear top view of the side angle adjustment mechanism of the head restraint of FIG. 3 with the side portions in the forward position.

The side angle adjustment mechanism 130 also includes a link arm 152 that attaches the nut 174 and the drive gear mechanism 133 on one of the side portions 114 together. The nut 174 is statically or rotatably attached to the top portion of the link arm 152 such that the nut 174 and the top portion of the link arm 152 move congruently to adjust the angle 116 of the side portions 114. Accordingly, both the top portion of the link arm 152 and the nut 174 are moved back and forth together along the length of the second lead screw 172 as the second lead screw 172 is rotated, as shown in FIGS. 18A-18B. The link arm 152 may have an oblong shape in order to allow for sufficient clearance for movement and rotation within the head supporting structure 36.

Figure 23:
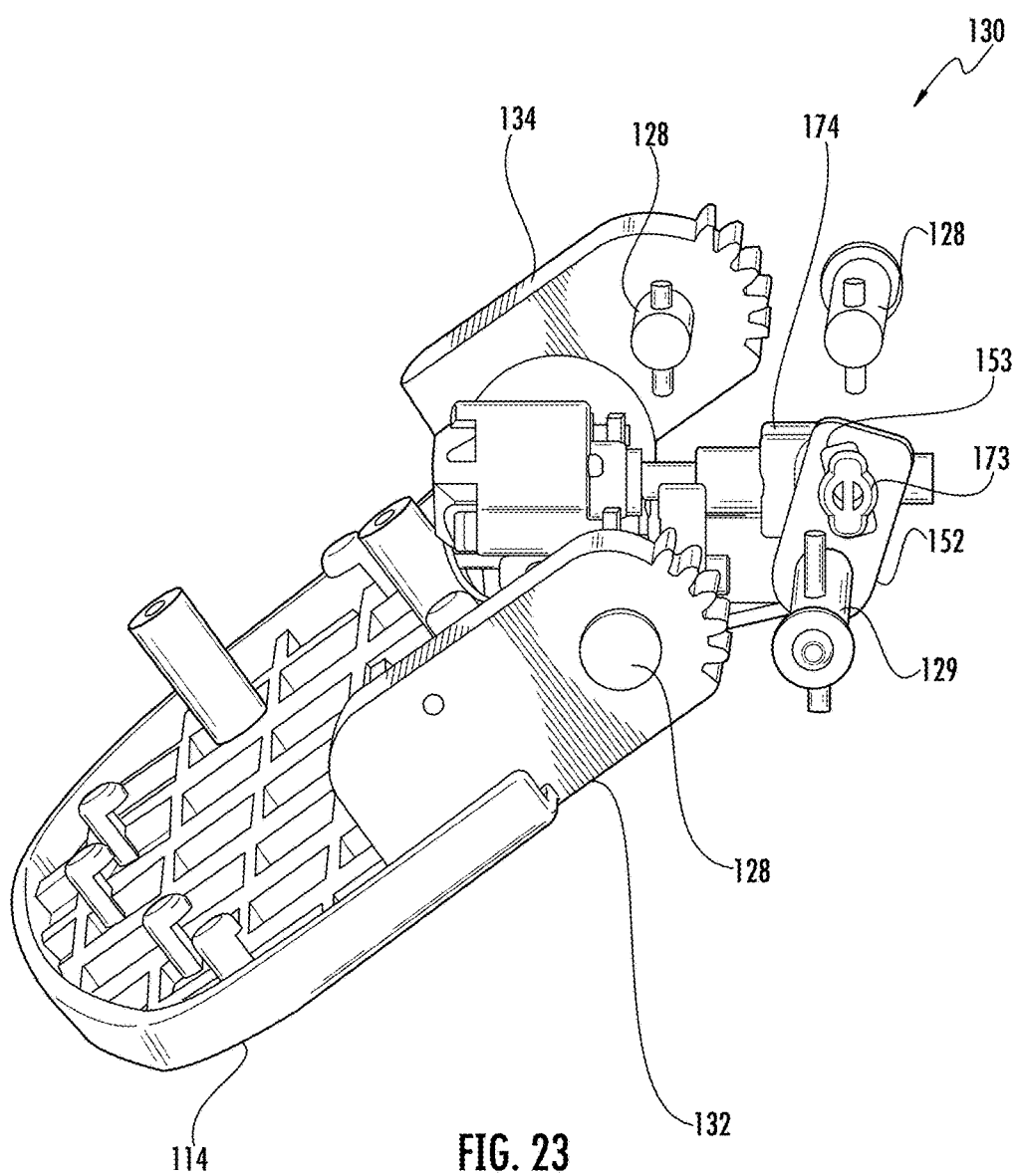
FIG. 23 is a perspective rear bottom view of the side angle adjustment mechanism of the head restraint of FIG. 3 with the rear cover, the height adjustment mechanism, one side portion, and the center portion removed.

As shown in FIG. 23, the link arm 152 has two apertures to attach to the nut 174 (via a link arm keying feature 153 (as described further herein) along the top potion of the link arm 152) and to statically and nonrotatably attach to a drive pivot pin 129 (via an aperture along the bottom portion of the link arm 152), thus allowing the link arm 152 to transfer movement from the nut 174 to the drive pivot pin 129. The link arm 152 and the drive pivot pin 129 may be statically and nonrotatably attached through, for example, a bolt. One of the vertical axes 148 can extend through the center of the drive pivot pin 129 and the bottom portion of the link arm 152.

The link arm 152 translates the linear movement of the nut 174 along the second lead screw 172 into rotation of the drive gear mechanism 133. For example, as the second lead screw 172 is rotated, the nut 174 moves the top portion of the link arm 152 along the length of the second lead screw 172. Since the bottom portion of the link arm 152 is attached to the drive pivot pin 129 and therefore cannot also move linearly, movement of the top portion of the link arm 152 (with the nut 174) along the second lead screw 172 rotates the link arm 152 about the vertical axis 148 extending through the center of the drive pivot pin 129 and the bottom portion of the link arm 152. Since the bottom portion of the link arm 152 is nonrotatably attached to the drive pivot pin 129, this rotation of the link arm 152 causes the drive pivot pin 129 (and thus the drive gear mechanism 133) to also rotate about the vertical axis 148.

Rotating the second lead screw 172 thus rotates the drive gear mechanism 133 on one of the side portions 114. Accordingly, the drive pivot pin 129 may be statically or non-movably attached to the drive gear mechanism 133 such that the drive pivot pin 129 transfers movement to the drive gear mechanism 133 and the drive pivot pin 129 and the drive gear mechanism 133 rotate congruently. The drive pivot pin 129 and the drive gear mechanism 133 may be non-movably attached with, for example, a set screw. The drive gear mechanism 133 is a part of one of the side portions 114 and accordingly directly moves that side portion 114.

Rotation of the drive gear mechanism 133 on one of the side portions 114 controls the movement of both of the side portions 114 by causing the slave gear mechanism 132 on the other of the side portions 114 to rotate congruently. Accordingly, as shown in FIGS. 22A-22B, the slave gear mechanism 132 is positioned on one of the side portions 114 directly opposite the drive gear mechanism 133 on the other side portion 114 and is complementary to the drive gear mechanism 133 such that the teeth of the slave gear mechanism 132 and the teeth of the drive gear mechanism 133 interlock. Due to the interlocking attachment between the teeth of the drive gear mechanism 133 and one of the slave gear mechanisms 132, the two side portions 114 move or rotate congruently.

As shown in FIGS. 21A-21B, the head supporting structure 36 may also include additional complementary stabilizing gear mechanisms 134 on each of the side portions 114 that interlock with each other through their teeth for additional stabilization and control, in particular while the side portions 114 are being adjusted. The stabilizing gear mechanisms 134 may be on, for example a top portion of each of the side portions 114, while the slave gear mechanism 132 and the drive gear mechanism 133 may be on a bottom portion of each of the side portions 114.

Each of the gear mechanisms 132, 133, 134 may be pivotally attached to the center portion 112. For example, the drive gear mechanism 133 is pivotally attached to the center portion 112 through the drive pivot shaft or pin 129. The slave gear mechanisms 132 and the stabilizing gear mechanisms 134 are pivotally attached to the center portion 112 through pivot shafts or pins 128.

Figure 16A:
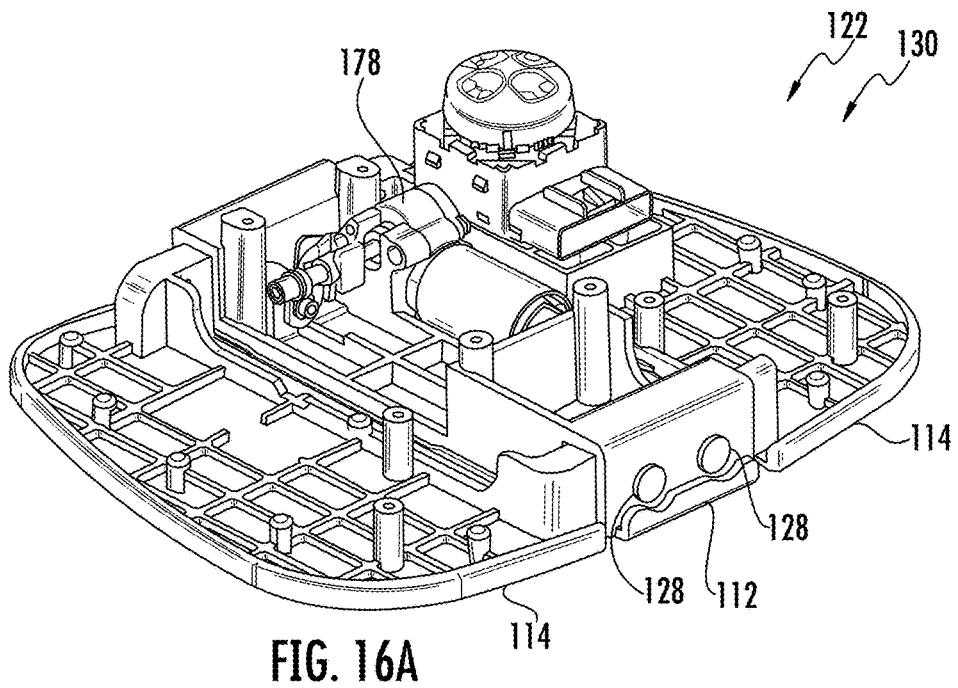
FIG. 16A is a perspective top rear view of the side angle adjustment mechanism of the head restraint of FIG. 3 with the side portions in the rearward position and with the rear cover and the height adjustment mechanism removed.
Figure 16B:
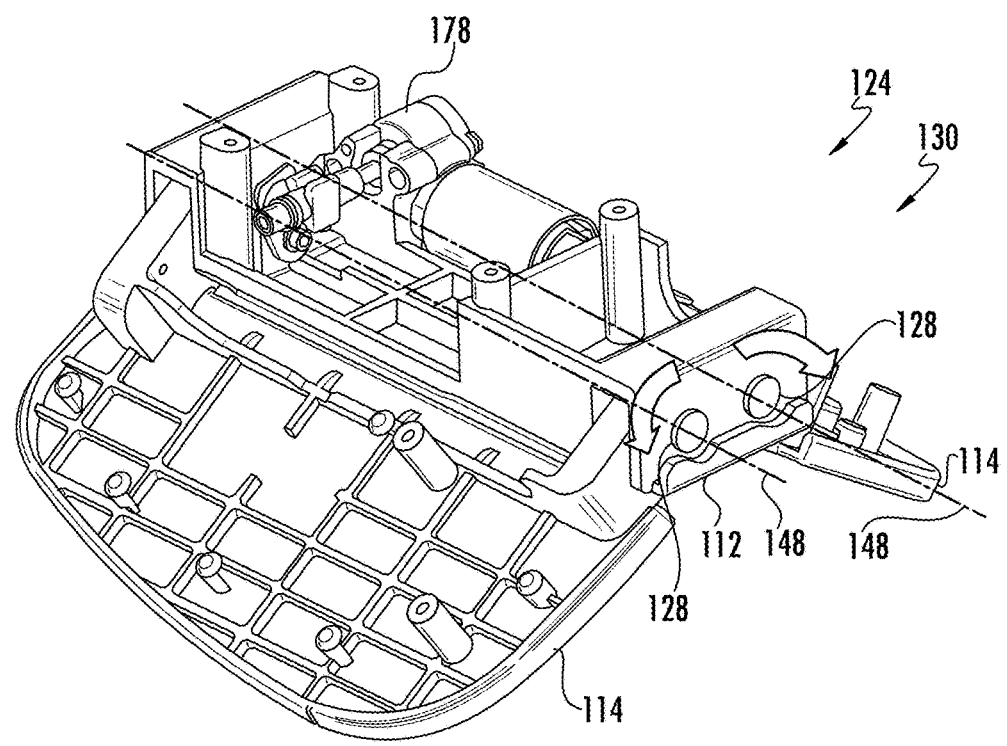
FIG. 16B is a perspective rear top view of the side angle adjustment mechanism of the head restraint of FIG. 3 with the side portions in the forward position and with the rear cover and the height adjustment mechanism removed.
Figure 17:
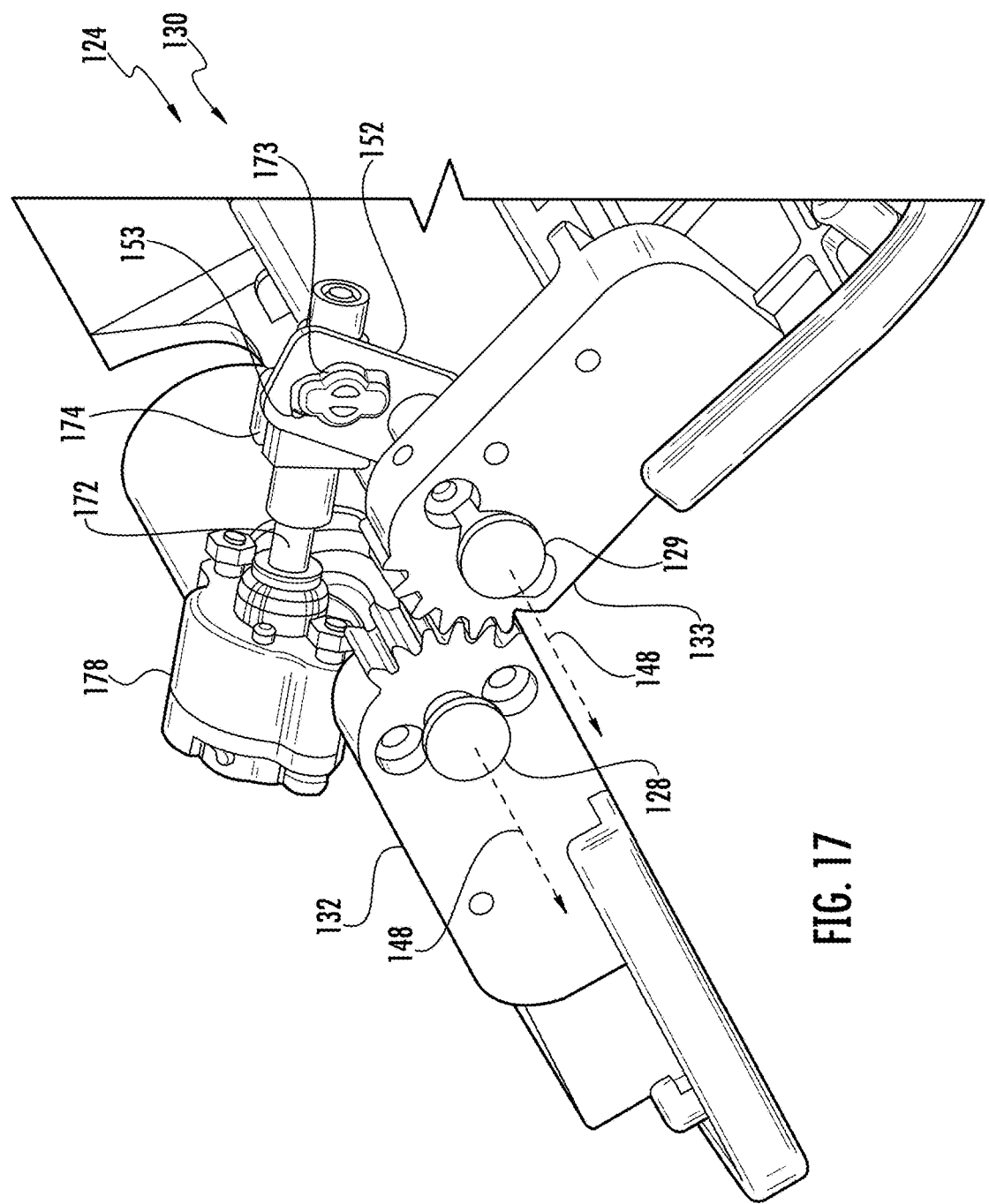
FIG. 17 is a perspective rear bottom view of the side angle adjustment mechanism of the head restraint of FIG. 3 with the side portions in the forward position and with the rear cover and the height adjustment mechanism removed.

As shown in FIGS. 16B and 17, each of the two vertical axes 148 may each extend through the middle of two respective pivot pin 128 or 129 on each of the side portions 114, such that each of the pivot pins 128, 129 (and thus each of the side portions 114) are rotatable about their respective vertical axis 148.

Additionally, the side angle adjustment mechanism 130 may include additional features in order to help control and guide the angular movement of the side portions 114 as well as to create a secure head rest assembly. For example, to control the angular movement of the side portions 114 as shown in FIGS. 18A-18B and 19A-20B, either end of the second lead screw 172 may have at least one bushing or travel stop 176 that sets the length of travel of the nut 174 along the second lead screw 172, which accordingly sets the amount that the side portions 114 can be angularly adjusted. For example, the stop 176 may contact the nut 174 at a particular location along the second lead screw 172 in order to limit the movement of the nut 174 along the length of the second lead screw 172. To change the amount of potential angular adjustment of the side portions 114, the stop(s) 176 may be moved along the second lead screw 172. Optionally, the attachment between the second lead screw 172 and the second motor and transmission assembly 178 may also function as a stop along one end of the second lead screw 172.

Figure 18C:
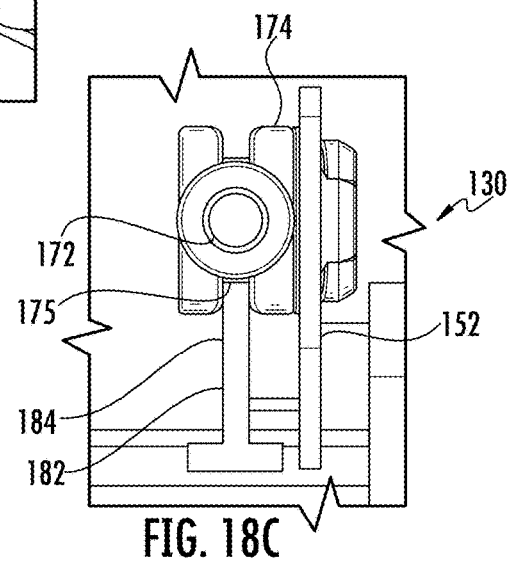
FIG. 18C is a cross-sectional view of a portion of the side angle adjustment mechanism of the head restraint of FIG. 3.
Figure 19A:
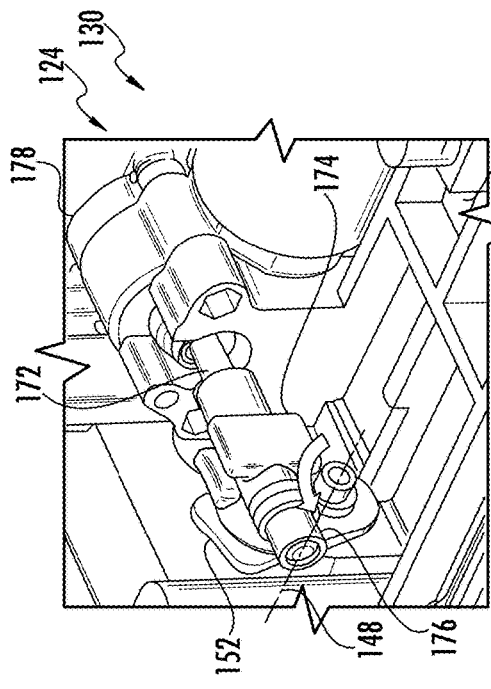
FIG. 19A is a perspective rear top view of the side angle adjustment mechanism of the head restraint of FIG. 3 with the side portions in the rearward position and with the guide bracket removed.
Figure 19B:
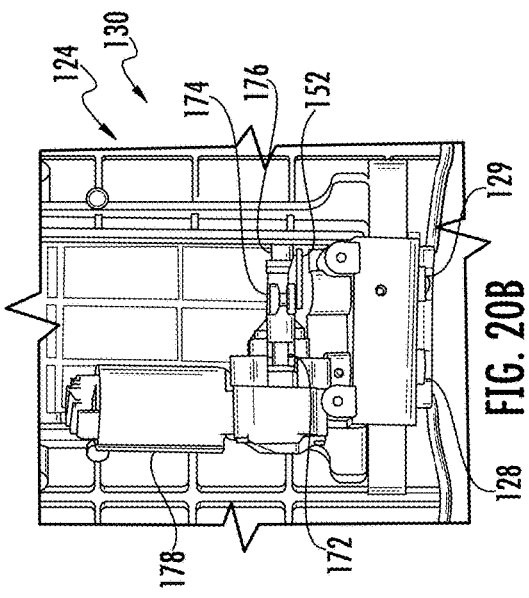
FIG. 19B is a perspective rear top view of the side angle adjustment mechanism of the head restraint of FIG. 3 with the side portions in the forward position and with the guide bracket removed.
Figure 20A:
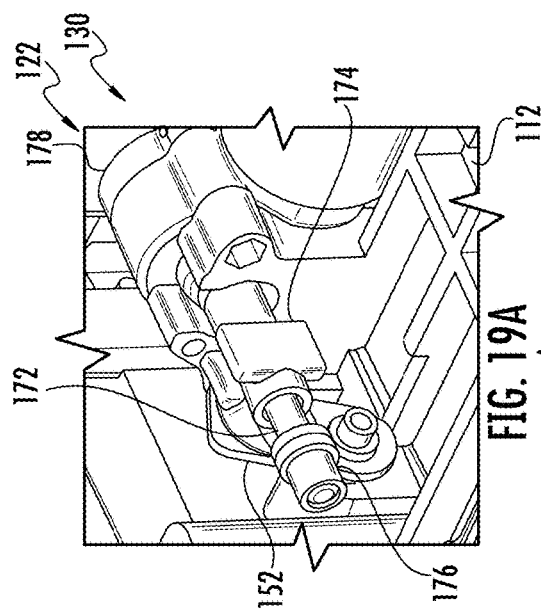
FIG. 20A is a rear view of the side angle adjustment mechanism of the head restraint of FIG. 3 with the side portions in the rearward position.
Figure 20B:
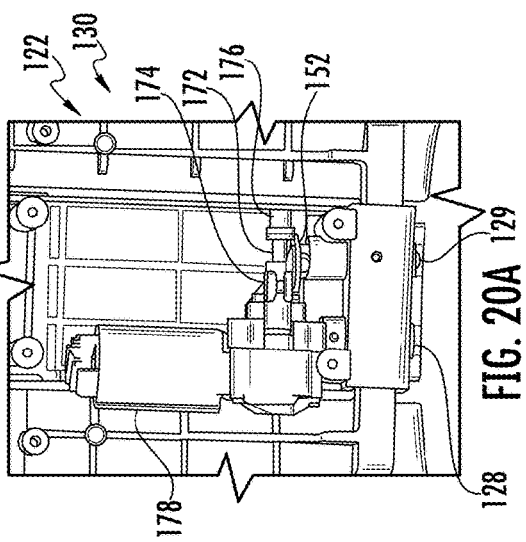
FIG. 20B is a rear view of the side angle adjustment mechanism of the head restraint of FIG. 3 with the side portions in the forward position.

Additionally, a bottom bracket or guide bracket 182 may help guide the movement of the nut 174 along the second lead screw 172 and support the nut 174 to prevent the nut 174 from rotating or moving out of alignment with the second lead screw 172, thus guiding the angular movement of the side portions 114. As shown in FIGS. 18A-18C, the guide bracket 182 may be positioned with the nut 174 such that the nut 174 may be movable along a portion of the length of the guide bracket 182. As shown in FIG. 18C, the edges of a side of the guide bracket 182 defines a guide or extension 184 that fits within or is received by a recess 175 on one side of the nut 174. Accordingly, the nut 174 overlaps opposite surfaces of the extension 184. As shown in FIGS. 18A-18B, a portion of the guide bracket 182 may also fit around a portion of the hub of the nut 174 in order to further stabilize the nut 174.

The extension 184 of the guide bracket 182 extends and is slidable within the recess 175 of the nut 174, allowing the nut 174 to move longitudinally along a portion of the length of the guide bracket 182 as the second lead screw 172 is rotated. The interaction between the extension 184 and the recess 175 prevents the nut 174 from rotating and forces the nut 174 to instead stably move longitudinally along the second lead screw 172, as well as removes any looseness between the two side portions 114. Accordingly, as the nut 174 is moved by the second lead screw 172, the nut 174 moves along the guide bracket 182 in a stable manner.

Furthermore, in order to create a secure head rest assembly, the nut 174 and the link arm 152 may be attached to each other through a keyed attachment (as shown in FIGS. 17 and 23). For example, the link arm 152 and the nut 174 may include a link arm keying feature 153 and a nut keying feature 173, respectively, in order to securely attach with each other during assembly and remain attached during use. The link arm keying feature 153 may be a keyed aperture, opening, or recess within the link arm 152 on, for example, a top portion of the link arm 152. The nut keying feature 173 may be a protrusion on the outer surface of the nut 174 that is shaped and sized to fit within the link arm keying feature 153 when the nut keying feature 173 and the link arm keying feature 153 are at a particular angle relative to each other during assembly. The nut keying feature 173 may be taller than the thickness of the top portion of the link arm 152 in order to lock to the link arm 152.

According to one embodiment, the link arm 152 may be rotated relative to the nut 174 in order to allow the nut keying feature 173 to fit within the link arm keying feature 153. Once the nut keying feature 173 is positioned within the link arm keying feature 153, the link arm 152 may be rotated relative to the nut 174 in order to prevent the nut keying feature 173 from being removed from the link arm keying feature 153, thus locking the link arm 152 and the nut 174 together. Once the link arm 152 and the nut 174 are attached to each other, the link arm 152 and the nut 174 may be configured to be statically or rotatably attached to each other.

Tilt Adjustment Mechanism

As shown in FIGS. 24A-28D, the head rest 30 includes the tilt adjustment mechanism 230. The tilt adjustment mechanism 230 is configured to change the tilt angle of the entire head supporting structure 36 of the head rest 30 relative to a tilt supporting structure 264 and the seat back 24 by rotating the head supporting structure 36 between a forward position 222 and a rearward position 226 about a substantially horizontal axis 248. Accordingly, the tilt adjustment mechanism allows the occupant to position and adjust the head rest 30 to the exact desired position in relation to their head and neck during normal use as well as when the seat back 24 is reclined. The tilt adjustment mechanism 230 provides additional degrees of freedom within the head rest 30 to allow the occupant to achieve their optimal or desired head and neck position, in particular while the seat back 24 is reclined.

The tilt adjustment mechanism 230 may be used to angularly adjust the tilt angle of the head supporting structure 36 about the horizontal axis 248. As shown in FIGS. 25 and 28A-28D, during normal use (e.g., while the seat back 24 is in the upright recline position), the tilt adjustment mechanism 230 can position the head supporting structure 36 in the upright position 224. However, depending on the occupant's preferences, the tilt adjustment mechanism 230 can rotate or tilt the head supporting structure 36 (relative to the seat back 24 and the tilt supporting structure 264) forward into the forward position 222 or backward into the rearward position 226. The tilt adjustment mechanism 230 can position the head supporting structure 36 anywhere within this range of tilt or pivot travel (e.g., between the forward position 222 and the rearward position 226). Although two ranges of travel are shown in FIGS. 25 and 28A-28D, the head supporting structure 36 can be configured to have a larger or smaller range of travel.

As shown in FIGS. 24A-24B and 27A, in order to angularly adjust the head supporting structure 36, the tilt adjustment mechanism 230 can pivot, tilt, or rotate the head supporting structure 36 about a substantially horizontal axis 248 (that is substantially perpendicular to the vertical axes 48 and 148). According to one embodiment, the horizontal axis 248 may be positioned below the head supporting structure 36 such that the head supporting structure 36 is rotated about the base of the head rest 30.

The tilt adjustment mechanism 230 includes a tilt supporting structure 264 that is statically attached to the seat back 24 and attaches the rest of the head rest 30 to the seat back 24. The tilt supporting structure 264 may optionally be a portion of the seat back 24 or statically attached to the seat back 24 (or another part of the vehicle, such as the seat frame or the floor). The tilt supporting structure 264 may include horizontal and/or vertical portions or bars. According to the embodiment shown in FIGS. 24A-26C, the tilt supporting structure 264 are vertical bars positioned on either side of the tilt adjustment mechanism 230. According to the embodiment shown in FIGS. 27A-28D, the tilt supporting structure 264 includes a horizontal bar and vertical bars supporting the horizontal bar. The horizontal bar may directly attach to the seat back 24 or the tilt supporting structure 264 may also include vertical bars on either side of the horizontal bar for static attachment.

According to one embodiment for example only and as shown in FIGS. 24A-26C, the tilt adjustment mechanism 230 may be a power recliner mechanism and may include at least one adjuster 232 and an adjuster bar 234 that is connected to the adjuster 232. According to one embodiment, the tilt adjustment mechanism 230 may include two adjusters 232 on both sides of the head supporting structure 36 that are connected by the adjuster bar 234. The tilt adjustment mechanism 230 can rotate the head supporting structure 36 about the horizontal axis 248 that extends through the center or middle of the at least one adjuster 232.

The adjuster bar 234 is rotatably attached to the tilt supporting structure 264 through the at least one adjuster 232 and is rotatable relative to the seat back 24. The head rest support 46 may be statically or nonrotatably attached to the adjuster bar 234 for support and to allow the tilt of the head supporting structure 36 to be adjusted. Although the power recliner mechanism is shown, a smaller angular adjuster may be used within the head rest.

In order to adjust the tilt angle of the head supporting structure 36 with the tilt adjustment mechanism 230 of FIGS. 24A-26C, the at least one adjuster 232 may rotate the adjuster bar 234 relative to the tilt supporting structure 264. Since the head rest support 46 is statically attached to the adjuster bar 234, rotation of the adjuster bar 234 rotates and changes the tilt angle of the head rest support 46 and the head supporting structure 36 relative to the tilt supporting structure 264 and the seat back 24.

According to another embodiment as shown in FIGS. 27A-28D, the tilt adjustment mechanism 230 includes a third threaded pin, bolt, bar, or lead screw 272 and a third motor and transmission assembly 278. The third lead screw 272 may include external threads along its length. As shown in FIG. 27A, the third lead screw 272 includes a pin 274 that extends substantially perpendicularly to the length of the third lead screw 272 and is positioned on a top portion of the third lead screw 272 in order to move the head supporting structure 36 (as described below).

The third motor and transmission assembly 278 is configured to turn, spin, or rotate the third lead screw 272 in order to rotate the head rest support 46 and change the tilt angle of the head rest support 46 and the head supporting structure 36 relative to the tilt supporting structure 264. The third motor and transmission assembly 278 may rotate the third lead screw 272 through conventional mechanism in order to adjust the tilt of the head supporting structure 36. For example, by rotating the third lead screw 272, the third lead screw 272 is moved up or down relative to the third motor and transmission assembly 278, which changes the tilt angle of the head supporting structure 36.

The head supporting structure 36 is attached to the head rest support 46 (as described further herein), which is pivotally attached to the tilt supporting structure 264 through a pivot attachment 266. Accordingly, the horizontal axis 248 (about which the head supporting structure 36 is rotated or tilted around) extends through the center of the pivot attachment 266.

The tilt adjustment mechanism 230 also includes a lever 260 that may be integral with or statically attached to the head rest support 46 such that movement of the lever 260 translates into movement of the head rest support 46 (and thus also the head supporting structure 36). As shown in FIG. 27B, the lever 260 may be curved. A first end of the lever 260 is statically attached to the head rest support 46 and a second end of the lever defines an aperture, hole, or recess 262 that is configured to receive the pin 274 of the third lead screw 272. Accordingly, the pin 274 is configured to be received by and move within the recess 262.

In order to adjust the tilt angle of the head supporting structure 36 with the tilt adjustment mechanism 230 of FIGS. 27A-28D, the third motor and transmission assembly 278 rotates the third lead screw 272, which moves the third lead screw 272 (and its pin 274) up or down. Since the pin 274 of the third lead screw 272 is positioned within the recess 262 of the lever 260, the pin 274 moves within the recess 262 and forces the lever 260 to move congruently with the third lead screw 272, which rotates the head rest support 46. For example, if the third lead screw 272 is rotated in a direction that moves the third lead screw 272 is moved upwards, the pin 274 moves within the recess 262 and pushes the sides of the recess 262 (and therefore the lever 260) upwards, which tilts the head rest support 46 and the head supporting structure 36 forward. Conversely, if the third lead screw 272 is rotated in a direction that moves the third lead screw 272 is moved downwards, the pin 274 moves within the recess 262 and pulls the sides of the recess 262 (and therefore the lever 260) downwards, which tilts the head rest support 46 and the head supporting structure 36 backward.

Since the lever 260 is statically attached to the head rest support 46 and the head rest support 46 is rotatably attached to the tilt supporting structure 264, the lever 260 and the head rest support 46 rotate about the pivot attachment 266 relative to the tilt supporting structure 264, which changes the tilt angle of the head supporting structure 36 relative to the tilt supporting structure 264 and the seat back 24 (as shown in FIGS. 28A-28D).

The head rest 30 may further include a linkage system that correlates tilting the head supporting structure 36 to the motion of the seat back 24 such that the tilt angle of the head supporting structure 36 depends on or is correlated to the recline angle of the seat back 24. Accordingly, the linkage system may link the tilt adjustment mechanism 230 to an existing seat recliner mechanism for the seat back 24 of the seat 22. The seat recliner mechanism may control any reclining of the seat back 24. As shown in FIGS. 26A-26C, the angle or tilt of the head supporting structure 36 may automatically change depending on the recline angle or position of the seat back 24 such that the tilt motion of the head supporting structure 36 is linked or directly correlated to the recline motion of the seat back 24. Accordingly, as the seat recliner mechanism reclines the seat back 24 about the recline horizontal axis 258, the linkage system may be moved, which may cause the tilt adjustment mechanism 230 to rotate the head supporting structure 36 about the tilt horizontal axis 248. The recline horizontal axis 258 and the tilt horizontal axis 248 may be substantially parallel. According to one embodiment, reclining the seat back 24 backward causes the tilt adjustment mechanism 230 to rotate the head supporting structure 36 backward toward the rearward position 226.

However, tilt adjustment mechanism 230 may be designed to be independently controlled from the seat recliner mechanism.

The embodiments disclosed herein provide a head restraint that can be adjusted in multiple different directions. Besides those embodiments depicted in the figures and described in the above description, other embodiments of the present invention are also contemplated. For example, any single feature of one embodiment of the present invention may be used in any other embodiment of the present invention.

Given the disclosure of the present invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. An adjustable head restraint assembly for a seat back of a seat, the adjustable head restraint assembly comprising:
    a head supporting structure configured to support an occupant's head;
    a head rest support that supports the head supporting structure and is configured to attach the head supporting structure to the seat back; and
    at least two of a height adjustment mechanism that is configured to change a height of the head supporting structure relative to the head rest support and the seat back and is electronically powered, a side angle adjustment mechanism that is configured to change the angle of side portions of the head supporting structure relative to a center portion of the head supporting structure and is electronically powered, and a tilt adjustment mechanism that is configured to change a tilt angle of the head supporting structure relative to a tilt supporting structure and the seat back and is electronically powered,
    wherein the height adjustment mechanism comprises a guiding assembly and a mounting bracket assembly, wherein the guiding assembly is configured to move the mounting bracket assembly in a vertical direction, wherein the vertical direction extends along the height of the head supporting structure, wherein vertical movement of the mounting bracket assembly changes the height of the head supporting structure,
    wherein the guiding assembly comprises a first motor and transmission assembly and a first lead screw, wherein the first motor and transmission assembly is configured to rotate the first lead screw in order to move the mounting bracket assembly in the vertical direction along a length of the first lead screw, which changes the height of the head supporting structure relative to the head rest support,
    wherein the mounting bracket assembly comprises a nut and a mounting bracket statically attached to each other and the nut is movably attached to the first lead screw such that the nut and the mounting bracket move congruently together along the length of the first lead screw as the first lead screw is rotated.

2. The adjustable head restraint assembly of claim 1, further comprising all three of the height adjustment mechanism, the side angle adjustment mechanism, and the tilt adjustment mechanism.

3. The adjustable head restraint assembly of claim 1, wherein each of the height adjustment mechanism, the side angle adjustment mechanism, and the tilt adjustment mechanism are independently controlled.

4. The adjustable head restraint assembly of claim 1, wherein the height adjustment mechanism is configured to move the head supporting structure between a low position and a high position, wherein the head supporting structure is relatively closer to the seat back in the low position and relatively further from the seat back in the high position.

5. The adjustable head restraint assembly of claim 1, wherein the guiding assembly comprises one or more tracks that are configured to guide the mounting bracket as the first lead screw is rotated.

6. The adjustable head restraint assembly of claim 1, wherein the guiding assembly comprises a guide region that extends along the length of the first lead screw and is configured to prevent the nut from rotating as the first lead screw rotates.

7. The adjustable head restraint assembly of claim 1, wherein the head supporting structure comprises a center portion and two side portions on either side of the center portion, wherein the two side portions are rotatably attached to the center portion, wherein the side angle adjustment mechanism is configured to rotate each of the side portions between a full rearward position and a full forward position relative to the center portion.

8. The adjustable head restraint assembly of claim 7, wherein the angle between a front surface of each of the side portions and a front surface of the center portion is greater in the full rearward position than in the full forward position.

9. The adjustable head restraint assembly of claim 7, wherein one of the side portions has a drive gear mechanism and the other of the side portions has a slave gear mechanism such that rotation of the one of the side portions causes the other of the side portions to rotate congruently.

10. The adjustable head restraint assembly of claim 7, wherein the side angle adjustment mechanism comprises a second motor and transmission assembly and a second lead screw, wherein the second motor and transmission assembly is configured to rotate the second lead screw, wherein rotation of the second lead screw causes the side portions to rotate relative to the center portion.

11. The adjustable head restraint assembly of claim 10, wherein rotating the second lead screw moves a nut along at least a portion of a length of the second lead screw, wherein linear movement of the nut along the second lead screw causes the side portions to rotate relative to the center portion.

12. The adjustable head restraint assembly of claim 11, wherein the side angle adjustment mechanism further comprises a link arm that attaches the nut and a drive gear mechanism on one of the side portions together, wherein the link arm translates the linear movement of the nut along the second lead screw into rotation of the drive gear mechanism.

13. The adjustable head restraint assembly of claim 10, wherein rotating the second lead screw rotates a drive gear mechanism of one of the side portions, wherein rotation of the drive gear mechanism causes a slave gear mechanism on the other of the side portions to rotate congruently.

14. The adjustable head restraint assembly of claim 1, wherein the tilt adjustment mechanism is configured to rotate the head supporting structure between a forward position and a rearward position about a substantially horizontal axis.

15. The adjustable head restraint assembly of claim 1, wherein the tilt adjustment mechanism comprises a tilt supporting structure, at least one adjuster, and an adjuster bar, wherein the adjuster bar is rotatably attached to the tilt supporting structure through the at least one adjuster and is nonrotatably attached to the head rest support, wherein the at least one adjuster is configured to rotate the adjuster bar relative to the tilt supporting structure, wherein rotation of the adjuster bar changes the tilt angle of the head rest support and the head supporting structure relative to the tilt supporting structure.

16. The adjustable head restraint assembly of claim 1, wherein the tilt adjustment mechanism comprises a tilt supporting structure, a third motor and transmission assembly, and a third lead screw, wherein the third motor and transmission assembly is configured to rotate the third lead screw in order to rotate the head rest support and change the tilt angle of the head rest support and the head supporting structure relative to the tilt supporting structure.

17. The adjustable head restraint assembly of claim 16, wherein the tilt adjustment mechanism comprise a lever, wherein a first end of the lever is statically attached to the head rest support and a second end of the lever defines a recess, wherein the third lead screw comprises a pin that is configured to be received by and move within the recess, wherein rotation of the third lead screw moves the pin within the recess, which moves the lever and rotates the head rest support.

* * * * *